US010565877B2

(12) United States Patent
Dudar

(10) Patent No.: US 10,565,877 B2
(45) Date of Patent: Feb. 18, 2020

(54) METHODS AND APPARATUS TO RELOCATE VEHICLES BASED ON VEHICLE AND ENVIRONMENTAL CHARACTERISTICS

(71) Applicant: Ford Global Technologies, LLC, Dearborn, MI (US)

(72) Inventor: Aed M. Dudar, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/313,653

(22) PCT Filed: Jun. 28, 2016

(86) PCT No.: PCT/US2016/039849
§ 371 (c)(1),
(2) Date: Dec. 27, 2018

(87) PCT Pub. No.: WO2018/004542
PCT Pub. Date: Jan. 4, 2018

(65) Prior Publication Data
US 2019/0259277 A1    Aug. 22, 2019

(51) Int. Cl.
*G08G 1/14* (2006.01)
*B60W 30/06* (2006.01)
*G01C 21/34* (2006.01)

(52) U.S. Cl.
CPC .............. *G08G 1/143* (2013.01); *B60W 30/06* (2013.01); *G01C 21/3453* (2013.01); *G08G 1/147* (2013.01); *B60W 2550/12* (2013.01)

(58) Field of Classification Search
CPC .......... G06K 9/00812; G06K 9/00791; G08G 1/141; G08G 1/14; G08G 1/146; G06T 7/90; B62D 15/027; B62D 15/0285
See application file for complete search history.

(56) References Cited

U.S. PATENT DOCUMENTS

| | | | | |
|---|---|---|---|---|
| 2013/0113936 A1* | 5/2013 | Cohen | ............ | G07B 15/02 348/148 |
| 2014/0036077 A1* | 2/2014 | Nerayoff | ............ | H04N 7/181 348/148 |
| 2014/0344026 A1* | 11/2014 | Outwater | ............ | G07B 15/02 705/13 |
| 2015/0138001 A1* | 5/2015 | Davies | ............ | G08G 1/149 340/932.2 |
| 2016/0084755 A1* | 3/2016 | Tripathi | ............ | G01N 21/3504 73/49.7 |
| 2017/0236417 A1* | 8/2017 | Carrara | ............ | G08G 1/141 340/932.2 |
| 2017/0249840 A1* | 8/2017 | Singh | ............ | G06K 9/00771 |

* cited by examiner

*Primary Examiner* — Mirza F Alam
(74) *Attorney, Agent, or Firm* — Brandon Hicks; Eversheds Sutherland (US) LLP

(57) ABSTRACT

Methods, apparatus, systems and articles of manufacture to relocate vehicles based on vehicle and environmental characteristics are disclosed. A vehicle includes a sensor to determine a temperature of an environment surrounding the vehicle, a vehicle identifier to determine a characteristic of the vehicle, and a parking spot selector to select a parking spot based on the temperature and the characteristic of the vehicle.

17 Claims, 12 Drawing Sheets

METHODS AND APPARATUS TO RELOCATE VEHICLES BASED ON VEHICLE AND ENVIRONMENTAL CHARACTERISTICS

FIELD OF THE DISCLOSURE

This disclosure relates generally to vehicle emissions control and, more particularly, to methods and apparatus to relocate vehicles based on vehicle and environmental characteristics.

BACKGROUND

In recent years, vehicle emissions have been increasingly monitored. Decreasing evaporative emissions of vehicles benefits the environment and, in some cases, increases the fuel efficiency of the vehicles. However, the amount of evaporative emissions of a vehicle is dependent on vehicle operation behavior. Often, vehicle operation behavior is dictated by driver preferences that may increase instead of decrease evaporative emissions.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Vehicle fuel (e.g., gasoline) is often volatile and, thus, can evaporate rapidly into vapor. Evaporative emissions are the result of fuel vapor escaping from a vehicle fuel system. In some examples, vehicles are equipped with metal (e.g., steel) fully-sealed fuel systems that prevent evaporative emissions from escaping into the atmosphere (e.g., plug-in hybrid vehicles). However, fully-sealed metal fuel systems are heavy and expensive. In more cost-effective examples, plastic or polyethylene fuel tanks are connected to an evaporative emissions control system to reduce evaporative emissions. In such examples, fuel vapor from the fuel tank and carburetor bowl vent (on carbureted vehicles) is directed into an evaporative emission control canister that contains activated carbon. The fuel vapor is absorbed by the activated carbon within the canister. During example engine operational modes, fresh air is drawn through the canister and forces the fuel vapor into the engine for fuel combustion.

Figure 1:
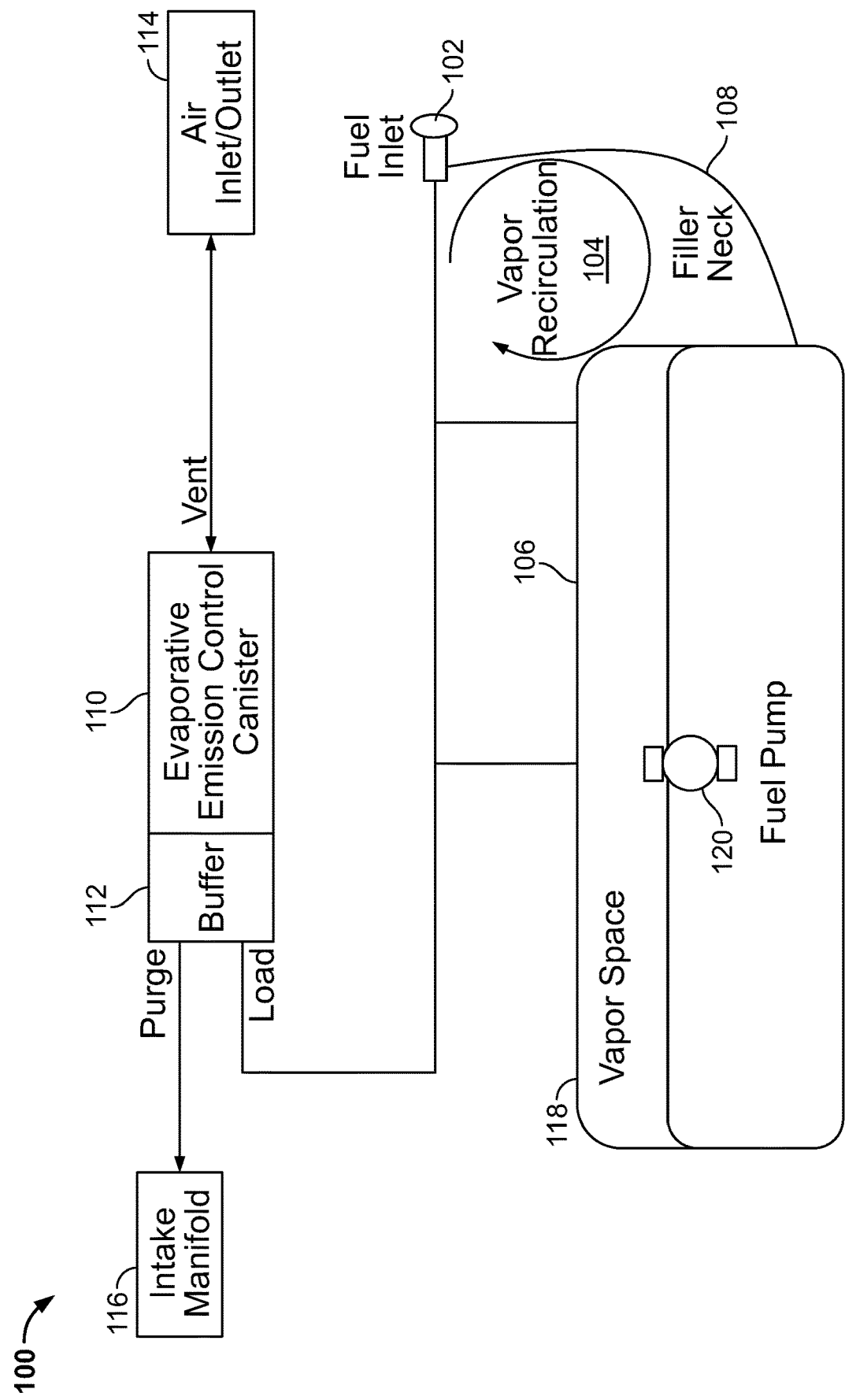
FIG. 1 is an illustration of an evaporative emission control system within a vehicle.

FIG. 1 is an illustration of an evaporative emission control system 100 disposed within a vehicle to reduce evaporative emissions. As discussed above, evaporative emissions are the result of fuel vapor escaping from the vehicle fuel system. In some examples, fuel vapor escapes via a fuel inlet 102 (e.g., gas cap) during vehicle re-fueling. In such examples, fuel vapor recirculation 104 occurs between a fuel tank 106 and a filler neck 108 and, when the fuel inlet 102 is opened, the recirculated fuel vapor is allowed to escape into the environment.

Additionally or alternatively, fuel vapor may be directed into a carbon-filled evaporative emission control ("EVAP") canister 110. The EVAP canister 110 contains activated carbon to absorb fuel vapor. Fuel vapor is loaded into a buffer 112 of the EVAP canister 110 and, over time, the EVAP canister 110 fills with the fuel vapor. In some examples, the fuel vapor expands beyond the buffer 112 of the EVAP canister 110. When the vehicle engine is running, air from an air inlet/outlet 114 forces stored fuel vapor within the EVAP canister 110 into an intake manifold 116 for combustion of the same, which purges the EVAP canister 110. In such examples, the fuel vapor is reclaimed as fuel instead of being released into the environment. However, the EVAP canister 110 may become saturated (e.g., the activated carbon cannot absorb any more fuel vapor) prior to vehicle engine operation. For example, the EVAP canister 110 may become saturated due to extended non-use of the vehicle. Any additional fuel vapor loaded into the EVAP canister 110 after saturation is vented into the environment via the air inlet/outlet 114.

The rate at which the EVAP canister 110 approaches saturation is dependent on various vehicle and environmental characteristics. Example vehicle characteristics include, without limitation, a vehicle type, a color of the vehicle, a size of the vehicle, a run time of the vehicle, an amount of fuel within the fuel tank 106, a fuel type, etc. Having less fuel within the fuel tank 106 provides more fuel vapor space 118 in which to form fuel vapor. As the amount of fuel vapor to be absorbed by the EVAP canister 110 increases, the EVAP canister 110 approaches saturation at an increased rate.

Different fuel types have different volatility. For example, diesel and biofuel have relatively low volatility (e.g., reid vapor pressure (RVP) less than 1 pounds per square inch (PSI)), while gasoline has relatively high fuel volatility (e.g., RVP within a range of 7-15 PSI). Additionally, fuel volatility may change throughout the year. During the winter season, high volatility fuel (e.g., fuel that has low evaporation temperatures) is distributed to ensure that vehicles start at lower temperatures. During the summer season, low volatility fuel (e.g., fuel that has high evaporation temperatures) is distributed to reduce evaporative fuel losses due to the higher temperatures. High volatility fuel forms fuel vapor at a faster rate than low volatility fuel. As described herein, vehicles with fuel cells (e.g., electric vehicles) are considered to have low fuel volatility (e.g., an RVP of zero).

Example environmental characteristics include, without limitation, a temperature surrounding the vehicle, characteristics of a surface on which the vehicle is located, a season, a time-of-day, weather, etc. Temperature can be a large factor in the saturation rate of the EVAP canister 110. As the temperature of fuel increases, more fuel evaporates into fuel vapor, which increases the amount of fuel vapor introduced into the EVAP canister 110. Fuel temperature may be increased due to heat generated by a fuel pump 120, heat generated by exhaust systems, the temperature of the vehicle, the temperature of the environment (e.g., surface temperature, ambient temperature, and/or sun loading), vehicle run time (e.g., length of time vehicle is/was running), etc.

Based on these various vehicle characteristics and environmental characteristics, the methods and apparatus described herein select a parking spot within one or more parking facilities to manage (e.g., reduce) evaporative emissions. As used herein, a parking facility refers to an indoor or outdoor parking lot, parking garage, multi-level parking structure, or other dedicated parking location for vehicles (e.g., cars, trucks, sport-utility-vehicles, motorcycles, etc.). The parking spot selector disclosed herein locates optimal parking spot locations such that first vehicles with first characteristics are relocated to first locations while second vehicles with second characteristics different from the first characteristics are relocated to second locations different from the first locations. As disclosed herein, vehicles with first characteristics are more susceptible to or affected by environmental characteristics than vehicles with second characteristics. Accordingly, vehicles with first characteristics are relocated to first locations protected from such environmental characteristics. For example, dark-colored vehicles are more affected by sun-loading and as a result, typically exhibit higher temperatures than light-colored vehicles. As used herein, dark-colored refers to a color that absorbs a portion or percentage of radiation from the sun more than a predetermined threshold amount of sun radiation (e.g., 40% of sun radiation, 50% of sun radiation, 60% of sun radiation, etc.). Examples of dark colors include, without limitation, black, charcoal, navy blue, forest green, etc. As used herein, light-colored refers to a color that absorbs a portion or percentage of radiation from the sun no more than the predetermined threshold. Examples of light colors include, without limitation, white, silver, yellow, orange, light green, etc. As disclosed herein, dark-colored vehicles absorb more radiation from sunlight than light-colored vehicles, have higher body and component temperatures than light-colored vehicles, and vaporize fuel at higher rate than light-colored vehicles. Additionally, dark-colored vehicles require more energy to lower the temperature within the vehicle than light-colored vehicles and, thus, potentially cause more evaporative emissions.

The parking spot selector disclosed herein instructs dark-colored vehicles that are currently located in open locations (e.g., in direct sunlight) to relocate to covered locations (e.g., shade, parking structure, etc.). Such relocation lowers the temperatures of dark-colored vehicles, which lowers the fuel vaporization and evaporative emissions of these vehicles.

The parking spot selector disclosed herein includes sensors to determine environmental characteristics surrounding a vehicle and a vehicle identifier to determine vehicle characteristics. For example, the parking spot selector determines that the temperature surrounding the vehicle is above a threshold and the vehicle is a dark-colored vehicle susceptible to excess sun loading. In such examples, the parking spot selector is to select a covered parking spot. In some examples, the parking spot selector determines that the temperature surrounding the vehicle is above a threshold and the vehicle is a light-colored vehicle. In such examples, the parking spot selector is to select a non-covered parking spot.

In general, the methods and apparatus to relocate vehicles based on vehicle and environmental characteristics disclosed herein may be used in connection with various vehicles. In some examples, the parking spot selector displays information to a driver of a vehicle. In some examples, the parking spot selector instructs autonomous vehicles to relocate to a selected parking spot. Specifically, the parking spot selector disclosed herein provides numerous advantages including, without limitation, decreasing the temperature of the vehicle, lowering the evaporative emissions of the vehicle, and increasing effective fuel efficiency of the vehicle.

Figure 2:
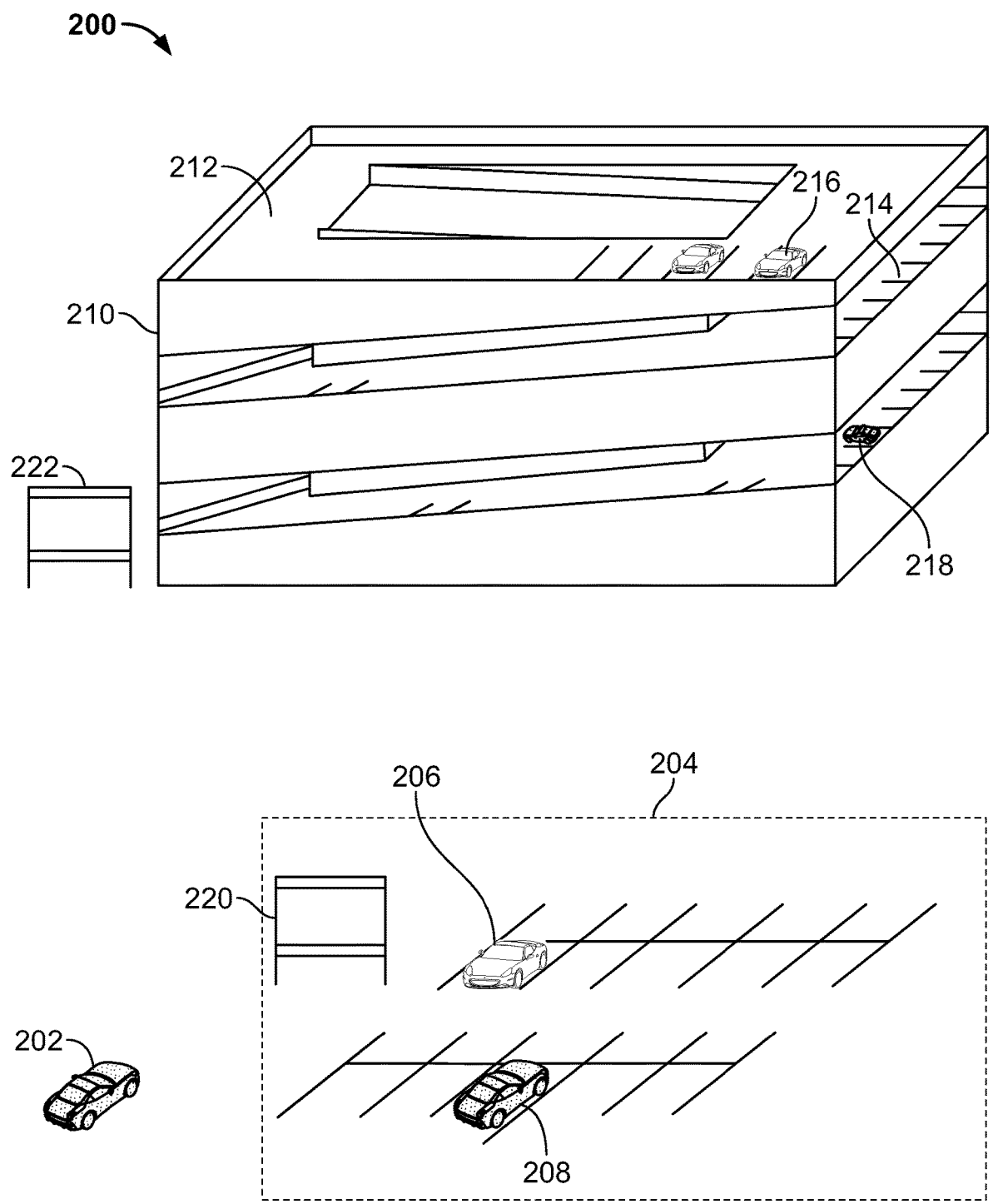
FIG. 2 is an illustration of an environment in which a vehicle is to select a parking spot within one or more example parking facilities.

FIG. 2 is an illustration of an environment 200 in which a vehicle 202 is to select a parking spot within one or more example parking facilities. In the illustrated example of FIG. 2, the vehicle 202 has a first set of vehicle characteristics (e.g., a dark-colored vehicle). The color of the vehicle 202 is one of many vehicle characteristics that affect the rate at which the EVAP canister 110 (FIG. 1) becomes saturated. Darker colored vehicles are more susceptible to sun loading (e.g., darker colors absorb more radiation from sunlight) and, thus, typically exhibit higher body and component temperatures. As disclosed above, higher fuel temperatures lead to excess loading of fuel vapor into the EVAP canister 110. The vehicle 202 uses the first set of characteristics in connection with environmental characteristics to select a parking spot.

The vehicle 202 is to evaluate a first parking facility 204. The first parking facility 204 is a collection of exposed or non-covered parking spot locations including one or more light-colored vehicles 206 and one or more dark-colored vehicles 208. In the illustrated example of FIG. 2, the first parking facility 204 is an outdoor parking lot.

The vehicle 202 is also to evaluate a second parking facility 210. The second parking facility 210 includes non-covered parking spot locations 212 and covered parking spot locations 214. In the illustrated example of FIG. 2, the second parking facility 210 is a parking garage. The second parking facility 210 includes vehicles relocated by the methods and apparatus disclosed herein. For example, one or more light-colored vehicles 216 have been relocated to the non-covered parking spot locations 212 and one or more dark-colored vehicles 218 have been relocated to the covered parking spot locations 214.

To relay parking information to the vehicle 202 and/or a driver of the vehicle 202, the first parking facility includes a first visual display 220, and the second parking facility 210 includes a second visual display 222. The first visual display 220 and the second visual display 222 include parking information corresponding to parking spot locations, parking spot availability, and/or parking spot characteristics. Example parking spot characteristics include covered/non-covered, asphalt/concrete surface, high/low ambient temperature, high/low surface temperature, etc. In some examples, the first visual display 220 and the second visual display 222 display the information for drivers of vehicles. In some examples, the first visual display 220 and the second visual display 222 relay (e.g., over a wireless network) the information to vehicle control systems, as further described in connection with FIG. 3.

Figure 3:
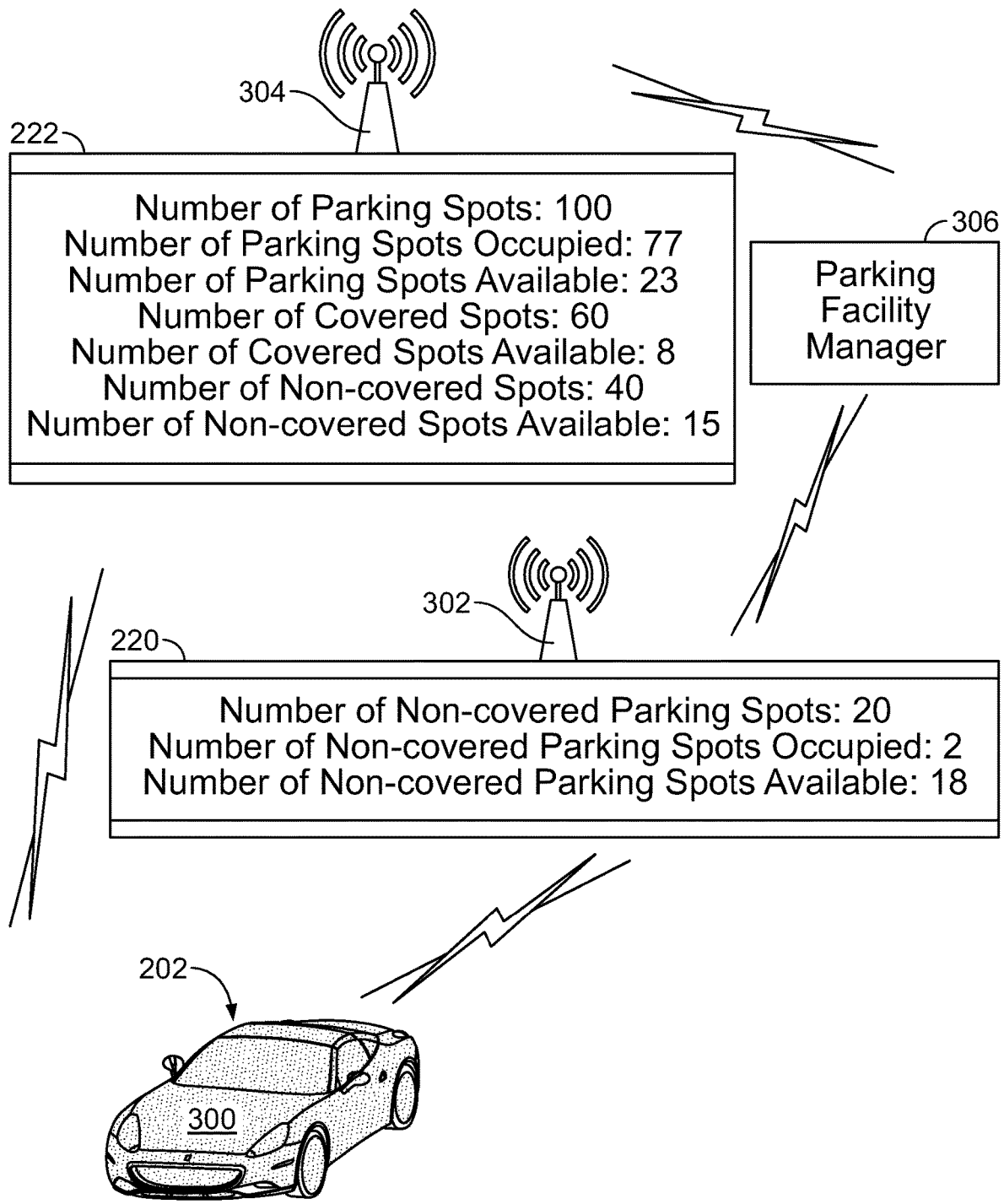
FIG. 3 is an illustration of the vehicle with a vehicle control system in communication with the one or more example parking facilities of FIG. 2.

FIG. 3 is an illustration of the vehicle 202 with a vehicle control system 300 in communication with the first visual display 220 and/or the second visual display 222 of FIG. 2.

In the illustrated example of FIG. 3, the first visual display 220 includes a transceiver 302 to obtain information from and/or relay information to the vehicle control system 300 of the vehicle 202. In some examples, the transceiver 302 is a wireless transceiver that communicates with the vehicle control system 300 over a network such as, for example, a cellular network or a WI-FI® network. In some examples, the transceiver 302 transmits and receives information over radio frequencies. In the illustrated example of FIG. 3, the transceiver 302 communicates to the vehicle control system 300, that the number of non-covered parking spots in the first parking facility 204 is twenty, two of the non-covered parking spots are occupied, and eighteen of the non-covered parking spots are available.

The second visual display 222 includes a transceiver 304 to obtain information from and/or relay information to the vehicle control system 300 of the vehicle 202. In the illustrated example of FIG. 3, the transceiver 304 communicates to the vehicle control system 300, that the number of parking spots in the second parking facility 210 is one hundred, seventy-seven of the parking spots are occupied, and twenty-three of the parking spots are available. In some examples, the transceiver 304 communicates that the number of covered parking spots in the second parking facility 210 is sixty, eight of which are available, and the number of non-covered parking spots in the second parking facility 210 is forty, fifteen of which are available. Additionally or alternatively, parking spot information such as, for example, surface characteristics, temperature, etc. may be likewise communicated.

In the illustrated example of FIG. 3, a parking facility manager 306 manages parking spot information and communicates with the first visual display 220, the second visual display 222, and/or the vehicle 202. As described herein, the first visual display 220 and the second visual display 222 can relay information received from the parking facility manager 306 to the vehicle 202. For example, the parking facility manager 306 may be off-site, and the first visual display 220 and the second visual display 222 act as relay points to relay information from/to the parking facility manager 306 to/from the vehicle 202. Additionally or alternatively, the parking facility manager 306 directly communicates with the vehicle 202 to obtain vehicle information from and/or send parking spot information to the vehicle 202. The parking facility manager 306 updates and/or communicates parking spot information corresponding to the first parking facility 204 to the first visual display 220, and/or parking spot information corresponding to the second parking facility 210 to the second visual display 222. The parking facility manager 306 maintains and/or updates information regarding parking spot locations, surface characteristics, availability, temperature, etc. of the first parking facility 204 and/or the second parking facility 210. As disclosed herein, the parking facility manager 306 identifies locations in the first parking facility 204 and/or the second parking facility 210 that are to reduce evaporative emissions of the vehicle 202. In some examples, the parking facility manager 306 identifies locations in the first parking facility 204 that are optimal for vehicles in the second parking facility 210. In some examples, the parking facility manager 306 identifies locations in the second parking facility 210 that are optimal for vehicles in the first parking facility 204.

Figure 4:
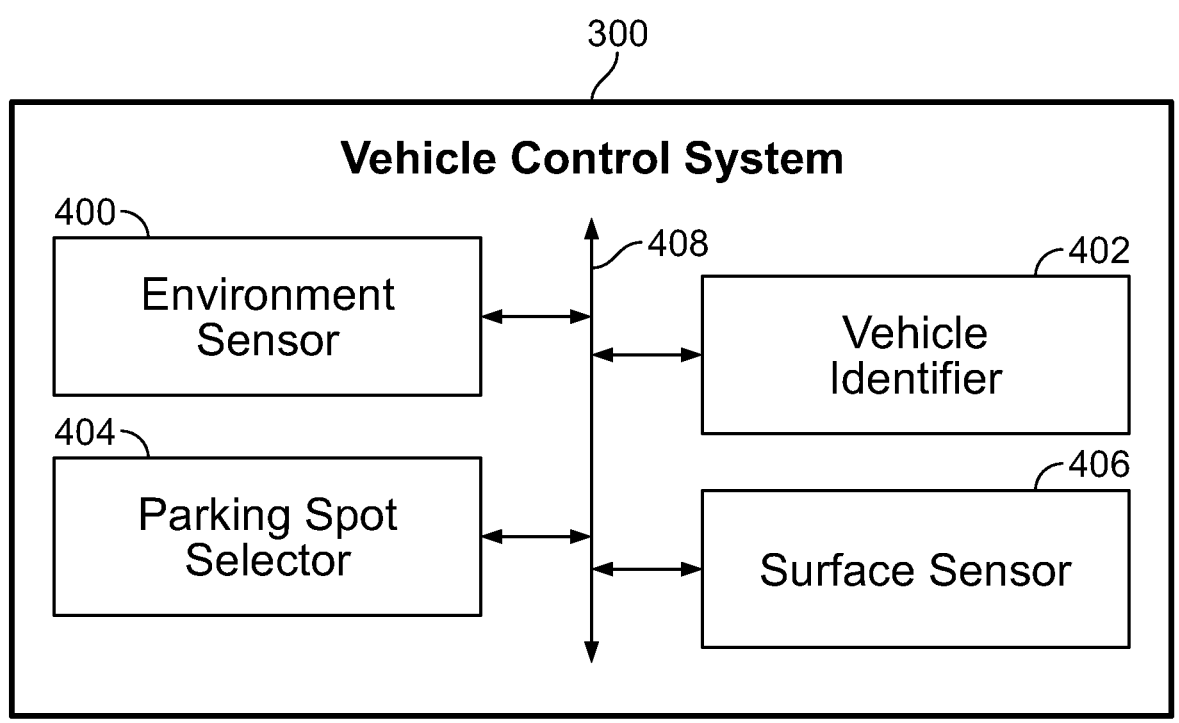
FIG. 4 is a block diagram of the vehicle control system of FIG. 3 including a parking spot selector.

FIG. 4 is a block diagram of an implementation of the vehicle control system 300 of FIG. 3. The vehicle control system 300 includes an environment sensor 400, a vehicle identifier 402, a parking spot selector 404, and a surface sensor 406. In the illustrated example of FIG. 4, the environment sensor 400, the vehicle identifier 402, the parking spot selector 404, and/or the surface sensor 406 are in communication via a bus 408 or otherwise communicatively coupled.

The environment sensor 400 determines one or more environmental characteristics relative to the vehicle 202. The environment sensor 400 may detect the temperature surrounding the vehicle 202 and/or the temperature within the vehicle 202 via a temperature sensor. The environment sensor 400 may also detect the ambient light intensity via a light sensor such as, for example, a photoresistor/light detecting resistor. Additionally, the environment sensor 400 may also determine the season, the time-of-day, and/or the weather, based on a programmed calendar/clock and/or additional information received via satellite, radio, over a network (e.g., the Internet), etc. The environment sensor 400 communicates the determined one or more environmental characteristics to the parking spot selector 404.

The vehicle identifier 402 identifies vehicle characteristics, such as, for example, the vehicle type, the color of the vehicle, the size of the vehicle, the weight of the vehicle, the number of miles driven (e.g., trip, total, etc.), the run time of the vehicle, the amount of fuel within the fuel tank 106, the fuel type, the instant and/or average fuel economy (e.g., miles per gallon (mpg)), the instant and/or average speed (e.g., miles per hour (mph)), etc. In some examples, non-varying characteristics of the vehicle 202 (e.g., the vehicle type, the color of the vehicle, the size of the vehicle, the weight of the vehicle) are pre-programmed into the vehicle identifier 402. In some examples, the vehicle identifier 402 determines the color of the vehicle 202 via an optical sensor such as, for example, a camera, such that the color of the vehicle 202 is determinable even if the original color of the vehicle is altered.

The vehicle identifier 402 determines the number of miles driven (e.g., trip, total, etc.), the run time of the vehicle, the amount of fuel within the fuel tank 106, the instant and/or average fuel economy (e.g., miles per gallon (mpg)), and/or the instant and/or average speed (e.g., miles per hour (mph)) based on one or more vehicle sensors (e.g., axle rotation sensor, fuel level sensor, etc.), dashboard indicators, and/or on-board computing devices that measure, manage, and/or display various vehicle characteristics for the benefit of the driver of the vehicle 202. In some examples, the vehicle identifier 402 determines the fuel type based on calendar information (e.g., high volatility fuel is distributed during winter months, low volatility fuel is distributed during summer months, etc.). In some examples, the vehicle identifier 402 determines the fuel type based on the type of vehicle engine (e.g., electric, gasoline, diesel, or biofuel engine). In some examples, the vehicle identifier 402 determines the fuel type via a fuel type sensor disposed within the fuel tank 106 to determine the volatility of the fuel (e.g., measure the RVP). The vehicle identifier 402 communicates the identified vehicle characteristics to the parking spot selector 404.

The parking spot selector 404 receives environmental characteristics determined by the example environment sensor 400 and vehicle characteristics identified by the vehicle identifier 402. In some examples, the parking spot selector 404 additionally receives surface characteristics detected by the surface sensor 406. The parking spot selector 404 communicates with at least one of the first visual display 220 of the first parking facility 204 or the second visual display 222 of the second parking facility 210 to determine parking spot locations, availability, and/or characteristics. The parking spot selector 404 evaluates the environmental characteristics, the vehicle characteristics, the surface characteristics, the parking spot locations, the parking spot availability, and/or the parking spot characteristics to select a parking spot for the vehicle 202. For example, the parking spot selector 404 determines that a dark-colored vehicle is parked in a non-covered parking spot and the temperature and/or the sun intensity determined by the light sensor is above a threshold. In such examples, the parking spot selector 404 selects a covered parking spot location and instructs the dark-colored vehicle to relocate to the covered parking spot location.

The surface sensor 406 detects characteristics of the surface on which the vehicle 202 is located. In some examples, the surface sensor 406 may detect the color of the surface via an optical sensor such as, for example, a camera. For example, the back-up camera of the vehicle 202 may be used to evaluate the color of the surface on which the vehicle 202 is located. In some examples, the surface sensor 406 may detect the temperature of the surface on which the vehicle is located via an infrared sensor. For example, the back-up camera of the vehicle 202 includes an infrared sensor for night-time operation. In such examples, the infrared sensor detects a temperature of the surface via infrared light.

In some examples, the surface sensor 406 determines whether it is necessary to determine surface characteristics. For example, if all surfaces in a location are the same, the characteristics of the surface may not provide decisive value to the parking spot selector 404. However, where the surfaces in a location vary, the characteristics of the surface may provide decisive value to the parking spot selector 404. Additionally or alternatively, in some examples the fuel tank 106 and/or the EVAP canister 110 (FIG. 1) of the vehicle 202 (FIG. 2) are located relatively close to the surface on which the vehicle is located. In such examples, the temperature of the surface on which the vehicle is located impacts the vaporization rate of the fuel and/or the saturation rate of the EVAP canister 110 and, thus, may provide decisive value to the parking spot selector 404. In examples where the surface sensor 406 determines surface characteristics, the surface sensor 406 communicates identified surface characteristics to the parking spot selector 404.

Figure 5:
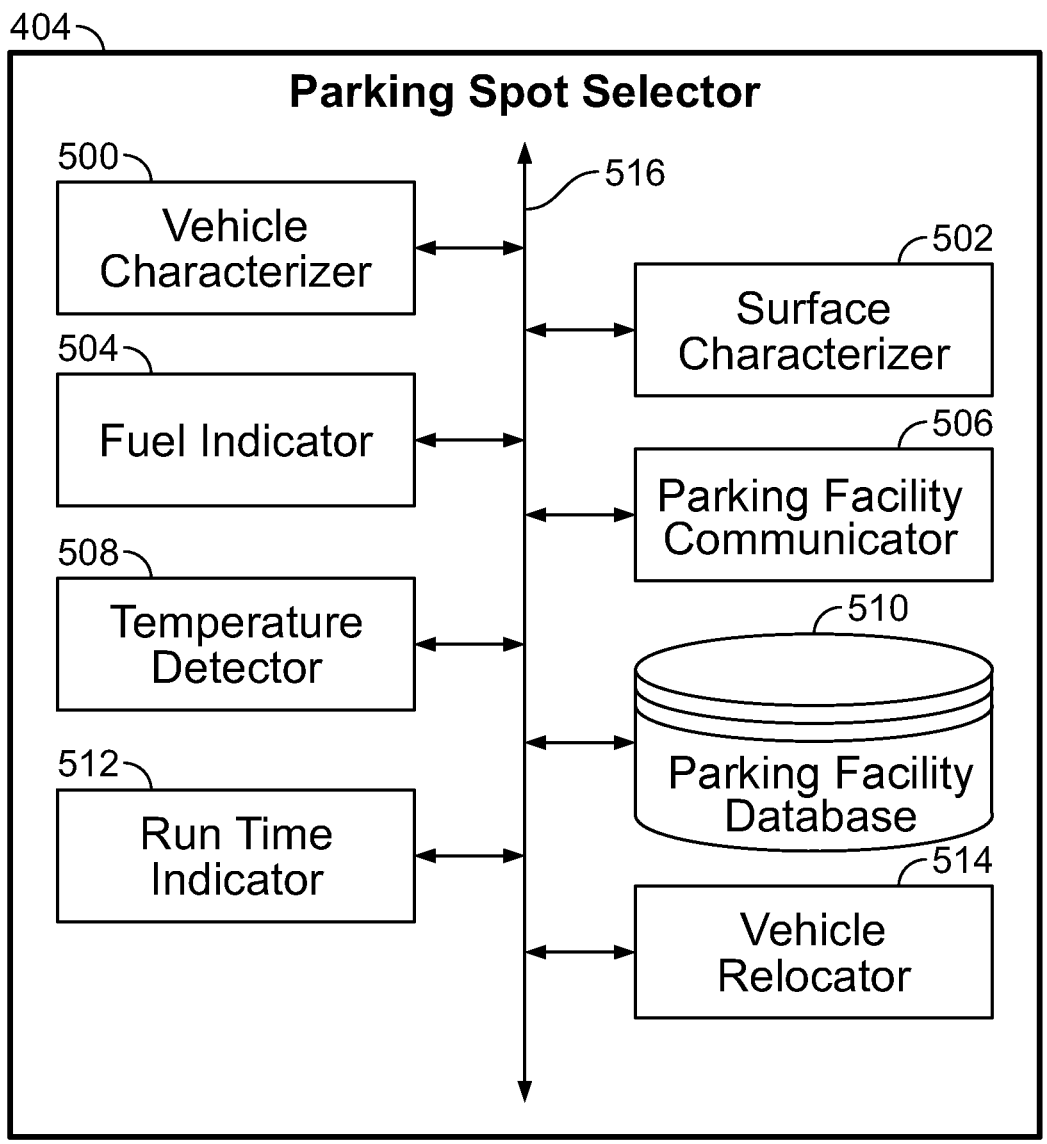
FIG. 5 is a block diagram of the parking spot selector of FIG. 4.

FIG. 5 is a block diagram of an implementation of the parking spot selector 404 of FIG. 4. The parking spot selector 404 includes a vehicle characterizer 500, a surface characterizer 502, a fuel indicator 504, a parking facility communicator 506, a temperature detector 508, a parking facility database 510, a run time indicator 512, and a vehicle relocator 514. In the illustrated example of FIG. 5, the vehicle characterizer 500, the surface characterizer 502, the fuel indicator 504, the parking facility communicator 506, the temperature detector 508, the parking facility database 510, the run time indicator 512, and/or the vehicle relocator 514 are in communication via a bus 516 or otherwise communicatively coupled.

The vehicle characterizer 500 of the parking spot selector 404 identifies vehicle characteristics received from the vehicle identifier 402 (FIG. 4) and makes determinations based on the identified vehicle characteristics. The vehicle characterizer 500 determines whether the vehicle type is a plug-in hybrid, whether the vehicle color is one that is highly affected by sun-loading (e.g., a dark color such as black), whether the vehicle size is large, etc. In some examples, the vehicle characterizer 500 makes such determinations by comparing the identified vehicle characteristics to one or more look-up tables. For example, the vehicle characterizer 500 determines whether the vehicle color is dark based on whether the color identified by the vehicle identifier 402 corresponds to a dark color in a look-up table. In some examples, the vehicle characterizer 500 makes determinations by comparing the identified vehicle characteristics to one or more thresholds. For example, the vehicle characterizer 500 determines whether the vehicle size is large based on a volume threshold (e.g., a large vehicle has a volume greater than one hundred and twenty cubic feet). The vehicle characterizer 500 communicates to the vehicle relocator 514, its determinations corresponding to the vehicle characteristics.

The surface characterizer 502 of the parking spot selector 404 identifies surface characteristics received from the surface sensor 406 (FIG. 4) and makes determinations based on the identified surface characteristics. The surface characterizer 502 determines whether the color of the surface is one that is highly affected by sun-loading (e.g., black). For example, the surface characterizer 502 determines whether the surface color is dark based on whether the color identified by the surface sensor 406 corresponds to a dark color in a look-up table. In some examples, the surface characterizer 502 makes determinations by comparing the identified surface characteristics to one or more thresholds. For example, the surface characterizer 502 determines whether the surface temperature is too hot based on a threshold (e.g., 85 degrees Fahrenheit). The surface characterizer 502 communicates to the vehicle relocator 514 its determinations corresponding to the surface characteristics.

The fuel indicator 504 of the parking spot selector 404 identifies the amount of fuel in the fuel tank and/or the fuel type of the vehicle 202 based on information received from the vehicle identifier 402 (FIG. 4) and makes determinations based on the identified amount of fuel and/or fuel type. The fuel indicator 504 determines whether the fuel in the fuel tank is low, whether the fuel type is high volatility fuel, etc. In some examples, the surface characterizer 502 makes determinations by comparing the identified amount of fuel to one or more thresholds. For example, the fuel indicator 504 determines whether the amount of fuel is low based on a threshold (e.g., half of the fuel tank). The fuel indicator 504 communicates to the vehicle relocator 514, its determinations corresponding to the fuel level and/or fuel type.

Figure 6:
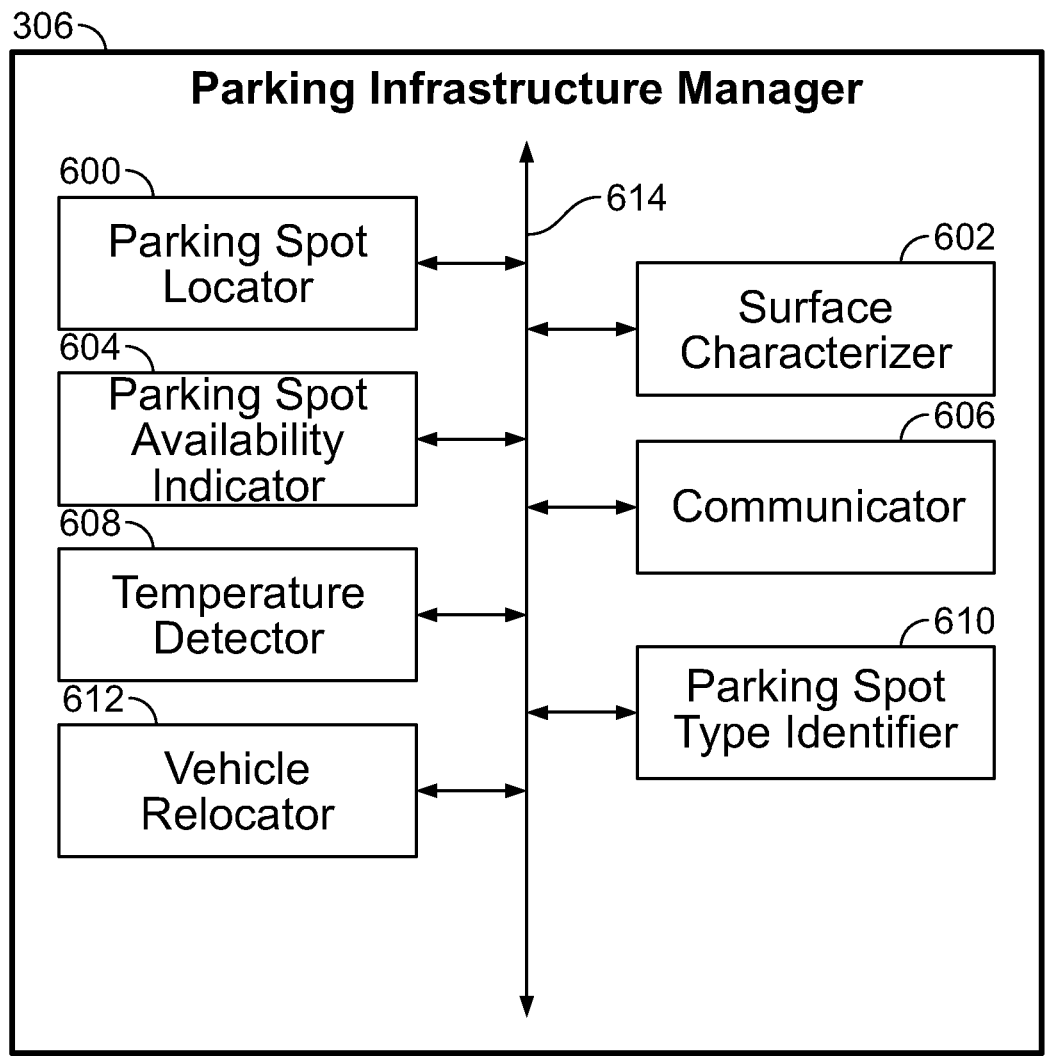
FIG. 6 is a block diagram of the parking facility manager of FIG. 3.

The parking facility communicator 506 of the parking spot selector 404 communicates with one or more parking facilities to determine parking spot locations, parking spot availability, and parking spot characteristics. For example, the parking facility communicator 506 communicates with the first visual display 220 (FIGS. 2, 3) of the first parking facility 204 (FIG. 2), the second visual display 222 (FIGS. 2, 3) of the second parking facility 210 (FIG. 2), and/or the parking facility manager 306 (FIGS. 3, 6). In some examples, the parking facility communicator 506 communicates wirelessly over a network such as, for example, a cellular or WI-FI® network. In some examples, the parking facility communicator 506 communicates via radio waves. In some examples, the parking facility communicator 506 communicates via optical communications (e.g., information on a digital display, infrared light transmission, laser communication, etc.). In some examples, the parking facility communicator 506 initiates communications when the vehicle 202 is within a threshold range of at least one of the first visual display 220 of the first parking facility 204, the second visual display 222 of the second parking facility 210, or the parking facility manager 306. In some examples, the parking facility communicator 506 does not initiate communications when the parking facility communicator 506 has previously communicated with the first visual display 220 of the first parking facility 204, the second visual display 222 of the second parking facility 210, and/or the parking facility manager 306 within a threshold time (e.g., fifteen minutes). The parking facility communicator 506 queries at least one of the first visual display 220 of the first parking facility 204, the second visual display 222 of the second parking facility 210, or the parking facility manager 306 to make available an occupied parking spot.

The temperature detector 508 of the parking spot selector 404 identifies the temperature of the vehicle 202 and/or the temperature surrounding the vehicle 202 received from the environment sensor 400 (FIG. 4) and/or the surface temperature received from the surface sensor 406 (FIG. 4) and makes determinations based on the identified temperatures. The temperature detector 508 determines whether the temperature of the vehicle 202, the temperature surrounding the vehicle 202, and/or the surface temperature is high enough to prompt a change in the parking location of the vehicle. As disclosed herein, as the surface temperature increases, so does the fuel temperature and amount of fuel vapors introduced into the EVAP canister 110. In some examples, the temperature detector 508 makes determinations by comparing the identified temperatures to one or more thresholds. For example, the temperature detector 508 determines whether the temperature of the vehicle 202 and/or the temperature surrounding the vehicle 202 is above a first threshold (e.g., 75 degrees Fahrenheit) and/or whether the surface temperature is above a second threshold (e.g., 85 degrees Fahrenheit). In some examples, the temperature detector 508 infers that the temperature surrounding the vehicle 202 is above the first threshold by determining that the sun intensity determined by a light sensor is above a third threshold. The temperature detector 508 communicates to the vehicle relocator 514 its determinations corresponding to the temperature.

The parking facility database 510 stores parking facility information received from at least one of the first visual display 220 of the first parking facility 204, the second visual display 222 of the second parking facility 210, and/or the parking facility manager 306 to avoid unnecessary communications. For example, when the parking facility information is unchanged since the last communication, communication with the at least one of the first visual display 220 of the first parking facility 204, the second visual display 222 of the second parking facility 210, and/or the parking facility manager 306 would provide redundant information. In the illustrated example, the parking facility database 510 is a tangible computer readable storage medium such as a CD-ROM, a floppy disk, a hard drive, a digital versatile disk (DVD), a Blu-ray disk, or other memory storage device or storage disk.

The run time indicator 512 of the parking spot selector 404 identifies the run time of the vehicle 202 received from the vehicle identifier 402 (FIG. 4) and makes determinations based on the identified run time. The run time indicator 512 determines whether the run time of the vehicle 202 is sufficiently long to affect the vaporization of fuel. In some examples, the run time indicator 512 makes determinations by comparing the identified run time to one or more thresholds. For example, the run time indicator 512 determines whether the run time of the vehicle 202 is above a threshold (e.g., an hour). The run time indicator 512 communicates to the vehicle relocator 514, its determinations corresponding to the vehicle run time.

The vehicle relocator 514 selects a parking spot based on determinations from the vehicle characterizer 500, the surface characterizer 502, the fuel indicator 504, the temperature detector 508, and/or the run time indicator 512, and/or parking spot locations, availability, and/or characteristics received from at least one of the first visual display 220 of the first parking facility 204, the second visual display 222 of the second parking facility 210, and/or the parking facility manager 306 and/or stored within the parking facility database 510. In some examples, the vehicle relocator 514 searches for parking spot locations having a parking spot type selected to reduce evaporative emissions based on the vehicle characteristics (e.g., a covered parking spot for a dark-colored vehicle, a non-covered parking spot for a light-colored vehicle, etc.). The vehicle relocator 514 first selects available potential parking spots for relocation. However, if no potential parking spots are available, the vehicle relocator 514 requests that the parking facility communicator 506 query at least one of the first visual display 220 of the first parking facility 204 (FIG. 2), the second visual display 222 of the second parking facility 210 (FIG. 2), or the parking facility manager 306 (FIG. 3) to make available a selected occupied parking spot. The vehicle relocator 514 instructs the vehicle 202 to relocate from its current position to the selected available parking spot (e.g., covered spot, non-covered spot, shaded spot, non-shaded spot, asphalt spot, concrete spot, etc.). In some examples, the vehicle relocator 514 instructs the vehicle 202 to relocate autonomously. In some examples, the vehicle relocator 514 instructs the vehicle 202 to present navigation directions to a driver so that the driver may relocate the vehicle 202 to the selected parking spot.

In some examples, the parking facility communicator 506 is to communicate with the parking facility manager 306 directly to determine parking spot locations, parking spot availability, and/or parking spot characteristics. In some examples, the parking facility communicator 506 is to communicate with the parking facility manager 306 indirectly by the sending information to and/or receiving information from at least one of the first visual display 220 of the first parking facility 204 or the second visual display 222 of the second parking facility 210. The parking facility database 510 stores previously communicated parking spot locations, parking spot availability, and/or parking spot characteristics to avoid unnecessary communications with the at least one of the first visual display 220 of the first parking facility 204, the second visual display 222 of the second parking facility 210, and/or the parking facility manager 306.

Based on the determinations of the vehicle characterizer 500, the surface characterizer 502, the fuel indicator 504, the temperature detector 508, and the run time indicator 512, and based on the parking facility information (e.g., parking spot locations, parking spot availability, and/or parking spot characteristics) received by the parking facility communicator 506 and/or stored in the parking facility database 510, the vehicle relocator 514 is to select a parking spot to which to relocate the vehicle 202.

FIG. 6 is a block diagram of the parking facility manager 306 of FIG. 3. The parking facility manager 306 includes a parking spot locator 600, a surface characterizer 602, a parking spot availability indicator 604, a communicator 606, a temperature detector 608, a parking spot type identifier 610, and a vehicle relocator 612. In the illustrated example of FIG. 6, the parking spot locator 600, the surface characterizer 602, the parking spot availability indicator 604, the communicator 606, the temperature detector 608, the parking spot type identifier 610, and/or the vehicle relocator 612 are in communication via a bus 614 or otherwise communicatively coupled.

The parking spot locator 600 determines parking spot locations within at least one of the first parking facility 204 or the second parking facility 210. In some examples, the parking spot locator 600 has information corresponding to parking spot locations within at least one of the first parking facility 204 or the second parking facility 210 mapped out and/or pre-programmed based on the physical layout of the at least one of the first parking facility 204 or the second parking facility 210. In some examples, the parking spot locator 600 determines parking spot locations within at least one of the first parking facility 204 or the second parking facility 210 via one or more optical sensors (e.g., cameras) disposed throughout the at least one of the first parking facility 204 or the second parking facility 210. The parking spot locator 600 communicates to the communicator 606, its determinations corresponding to the parking spot locations.

The surface characterizer 602 determines surface characteristics of the determined parking spot locations within at least one of the first parking facility 204 or the second parking facility 210. In some examples, the surface characterizer 602 has information corresponding to the color of the surface and/or the type of surface (e.g., asphalt, concrete, etc.) pre-programmed. In some examples, the surface characterizer 602 detects the color of the surface via an optical sensor such as, for example, a camera, disposed within the first parking facility 204 or the second parking facility 210. The surface characterizer 602 determines whether the surface is asphalt or concrete based on the detected color. The surface characterizer 502 communicates to the communicator 606 its determinations corresponding to the surface characteristics.

The parking spot availability indicator 604 determines parking spot availability of the determined parking spot locations within at least one of the first parking facility 204 or the second parking facility 210. In some examples, the parking spot availability indicator 604 detects whether a parking spot is available or occupied via the optical sensor (e.g., camera). In some examples, the parking spot availability indicator 604 detects whether a parking spot is available or occupied via a proximity sensor (e.g., laser, ultrasonic sensor, infrared sensor, etc.) disposed adjacent the parking spot locations within the first parking facility 204 and/or the second parking facility 210. For example, the first parking facility 204 or the second parking facility 210 may include proximity sensors that are triggered when vehicles enter or exit a parking spot location. In such examples, the proximity sensors communicate the availability of a parking spot location to the parking spot availability indicator 604 and/or to drivers of vehicles (e.g. a visual notification of an available parking spot in a row of occupied parking spots). The parking spot availability indicator 604 communicates to the communicator 606 its determinations corresponding to the availability of the determined parking spot locations within the at least one of the first parking facility 204 or the second parking facility 210.

The communicator 606 communicates the determined parking spot locations, parking spot availability, and parking spot characteristics to one or more vehicles (e.g., the vehicle 202). In some examples, the communicator 606 sends the determined parking spot locations, parking spot availability, and parking spot characteristics to at least one of the first visual display 220 of the first parking facility 204 or the second visual display 222 of the second parking facility 210 for relaying to the one or more vehicles. In some examples, the communicator 606 communicates wirelessly over a network such as, for example, a cellular or WI-FI® network. The communicator 606 receives, from a first vehicle, a query to make available an occupied parking spot location. In such examples, the communicator 606 instructs the vehicle relocator 612 to search for a parking spot occupied by a second vehicle having vehicle characteristics different from the first vehicle, so that the second vehicle may be relocated.

The temperature detector 608 determines temperature characteristics of the determined parking spot locations within at least one of the first parking facility 204 or the second parking facility 210. In some examples, temperature detector 608 detects the ambient temperature and/or the temperature of the surface on which the vehicle is located via one or more temperature sensors. In some examples, the temperature detector 608 detects the temperature of the surface on which the vehicle is located via an infrared sensor. The parking spot availability indicator 604 communicates to the communicator 606 its determinations corresponding to the ambient temperature and/or the temperature of the surface on which the vehicle is located.

The parking spot type identifier 610 determines parking spot types for the determined parking spot locations within at least one of the first parking facility 204 or the second parking facility 210. In some examples, the parking spot type identifier 610 has information corresponding to the type of parking spot (e.g., covered, non-covered, shaded, non-shaded, etc.) pre-programmed. In some examples, the parking spot type identifier 610 detects the parking spot type via an optical sensor (e.g., a camera) disposed within the first parking facility 204 or the second parking facility 210. In some examples, the parking spot type identifier 610 detects the parking spot type via a light sensor (e.g., a photoresistor) disposed within the first parking facility 204 or the second parking facility 210. In such examples, the parking spot type identifier 610 associates a parking spot type of "covered" and/or "shaded" when a measurement from the light sensor is below a first threshold and associates a parking spot type of "non-covered" and/or "non-shaded" when a measurement from the light sensor is above the first threshold. In some such examples, the parking spot type identifier 610 associates a parking spot type of "covered" when a measurement from the light sensor is below the first threshold and below a second threshold lower than the first threshold. In some such examples, the parking spot type identifier 610 associates a parking spot type of "non-covered" when a measurement from the light sensor is above the first threshold and above a third threshold higher than the first threshold. The parking spot type identifier 610 communicates to the communicator 606, its determinations corresponding to the parking spot types.

In examples where a parking facility does not have an available parking spot, the vehicle relocator 612 searches for occupied parking spot locations having vehicles that would otherwise be relocated by the methods and apparatus disclosed herein (e.g., a light-colored or plug-in hybrid vehicle in a covered parking spot). In some examples, the vehicle relocator 612 searches for parking spot locations occupied by a second vehicle having one or more vehicle characteristics opposite from a first vehicle. For example, if the first vehicle is a light-colored small vehicle with more than a threshold amount of low volatility fuel that was running for less than a threshold amount of time, then the vehicle relocator 612 searches for parking spot locations occupied by a second vehicle being a dark-color, having a large size, having more than a threshold amount of fuel, having high volatility fuel, or having been run for more than a threshold amount of time. If such a parking spot location is located, the vehicle relocator 612 relocates the second vehicle. As disclosed herein, first vehicles with first characteristics are relocated to first locations while second vehicles with second characteristics different from the first characteristics are relocated to second locations different from the first locations. For example, if the query comes from a first vehicle occupying a second location, the vehicle relocator 612 searches for a second vehicle occupying a first location, such that the first vehicle may be relocated to the first location and the second vehicle may be relocated to the second location (i.e., the vehicles exchange parking spots).

The vehicle relocator 612 searches for parking spot locations having a first parking spot type optimized based on the first vehicle characteristics (e.g., a covered parking spot for a dark-colored vehicle, a non-covered parking spot for a light-colored vehicle, etc.). Of the parking spot locations having the first parking spot type optimized based on the first vehicle characteristics, the vehicle relocator 612 searches for second vehicles for which the parking spot location is not optimized (e.g., a light-colored vehicle in a covered parking spot, a dark-colored vehicle in a non-covered spot, etc.). The vehicle relocator 612 selects a non-covered parking spot for the second vehicle and instructs the second vehicle to relocate from its current position to the non-covered parking spot. In some examples, the vehicle relocator 612 instructs the vehicle 202 to relocate autonomously. In some examples, the vehicle relocator 612 instructs the vehicle 202 to present navigation directions to a driver so that the driver may relocate the vehicle 202 to the selected parking spot.

In response to a query from the vehicle 202 to relocate a second vehicle currently parked in at least one of the first parking facility 204 or the second parking facility 210, the vehicle relocator 612 identifies the second vehicle in an occupied parking location. The vehicle relocator 612 determines whether the occupied parking spot is a first type (e.g., covered parking spot) and whether the second vehicle has a first characteristic (e.g., dark-colored).

In examples where the vehicle 202 has the first characteristic (e.g., dark-colored), the vehicle relocator 612 searches for another vehicle when the occupied parking spot is a second type (e.g., non-covered parking spot) or when the second vehicle has the first characteristic (e.g., dark-colored). Additionally or alternatively, the vehicle relocator 612 selects a parking spot location of the second type (e.g., non-covered parking spot) and instructs the second vehicle having a second characteristic (e.g., light-colored) and occupying a parking spot of the first type (e.g., covered parking spot) to relocate to the selected parking spot location of the second type. In some examples, the vehicle relocator 612 instructs the second vehicle to relocate autonomously. In some examples, the vehicle relocator 612 instructs the second vehicle to present navigation directions to a driver so that the driver may relocate the second vehicle to the selected parking spot.

In examples where the vehicle 202 has the second characteristic (e.g., light-colored), the vehicle relocator 612 searches for another vehicle when the occupied parking spot is the first type (e.g., covered parking spot) or when the second vehicle has the second characteristic (e.g., light-colored). Additionally or alternatively, the vehicle relocator 612 selects a parking spot location of the first type (e.g., covered parking spot) and instructs the second vehicle having the first characteristic (e.g., dark-colored) and occupying a parking spot of the second type (e.g., non-covered parking spot) to relocate to the selected parking spot location of the first type. In some examples, the vehicle relocator 612 instructs the second vehicle to relocate autonomously. In some examples, the vehicle relocator 612 instructs the second vehicle to present navigation directions to a driver so that the driver may relocate the second vehicle to the selected parking spot.

While a manner of implementing the vehicle control system 300 of FIG. 3 is illustrated in FIG. 4, a manner of implementing the parking spot selector 404 of FIG. 4 is illustrated in FIG. 5, and a manner of implementing the parking facility manager 306 of FIG. 3 is illustrated in FIG. 6, one or more of the elements, processes and/or devices illustrated in FIGS. 4, 5, and/or 6 may be combined, divided, re-arranged, omitted, eliminated and/or implemented in any other way. Further, the environment sensor 400, the vehicle identifier 402, the parking spot selector 404, the surface sensor 406, and/or, more generally, the vehicle control system 300 of FIG. 3; the vehicle characterizer 500, the surface characterizer 502, the fuel indicator 504, the parking facility communicator 506, the temperature detector 508, the parking facility database 510, the run time indicator 512, the vehicle relocator 514, and/or, more generally, the parking spot selector 404 of FIG. 4; and/or the parking spot locator 600, the surface characterizer 602, the parking spot availability indicator 604, the communicator 606, the temperature detector 608, the parking spot type identifier 610, the vehicle relocator 612, and/or, more generally, the parking facility manager 306 of FIG. 3 may be implemented by hardware, software, firmware and/or any combination of hardware, software and/or firmware. Thus, for example, any of the environment sensor 400, the vehicle identifier 402, the parking spot selector 404, the surface sensor 406, the vehicle characterizer 500, the surface characterizer 502, the fuel indicator 504, the parking facility communicator 506, the temperature detector 508, the parking facility database 510, the run time indicator 512, the vehicle relocator 514, and/or, more generally, the parking spot selector 404, the parking spot locator 600, the surface characterizer 602, the parking spot availability indicator 604, the communicator 606, the temperature detector 608, the parking spot type identifier 610, and/or the vehicle relocator 612 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the environment sensor 400, the vehicle identifier 402, the parking spot selector 404, the surface sensor 406, the vehicle characterizer 500, the surface characterizer 502, the fuel indicator 504, the parking facility communicator 506, the temperature detector 508, the parking facility database 510, the run time indicator 512, the vehicle relocator 514, the parking spot locator 600, the surface characterizer 602, the parking spot availability indicator 604, the communicator 606, the temperature detector 608, the parking spot type identifier 610, the vehicle relocator 612 is/are hereby expressly defined to include a tangible computer readable storage device or storage disk such as a memory, a digital versatile disk (DVD), a compact disk (CD), a Blu-ray disk, etc. storing the software and/or firmware. Further still, the vehicle control system 300 of FIG. 3 may include one or more elements, processes and/or devices in addition to, or instead of, those illustrated in FIG. 4, and/or may include more than one of any or all of the illustrated elements, processes and devices; the parking spot selector 404 of FIG. 4 may include one or more elements, processes and/or devices in addition to, or instead of, those illustrated in FIG. 5, and/or may include more than one of any or all of the illustrated elements, processes and devices;

and the parking facility manager 306 of FIG. 3 may include one or more elements, processes and/or devices in addition to, or instead of, those illustrated in FIG. 6, and/or may include more than one of any or all of the illustrated elements, processes and devices.

Figure 7:
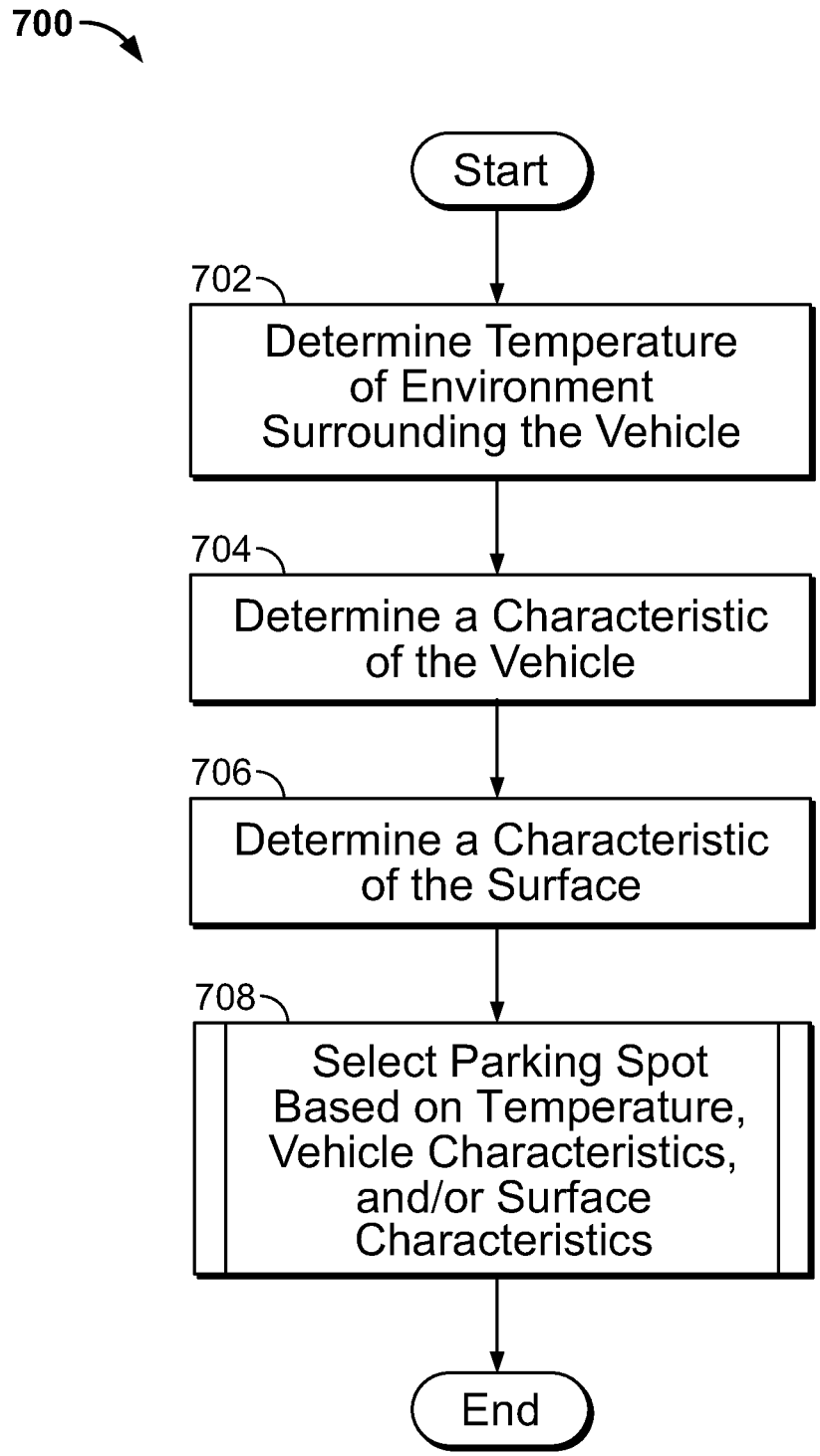
FIG. 7 is a flowchart representative of an example method that may be performed to implement the vehicle control system of FIG. 4.
Figure 8A:
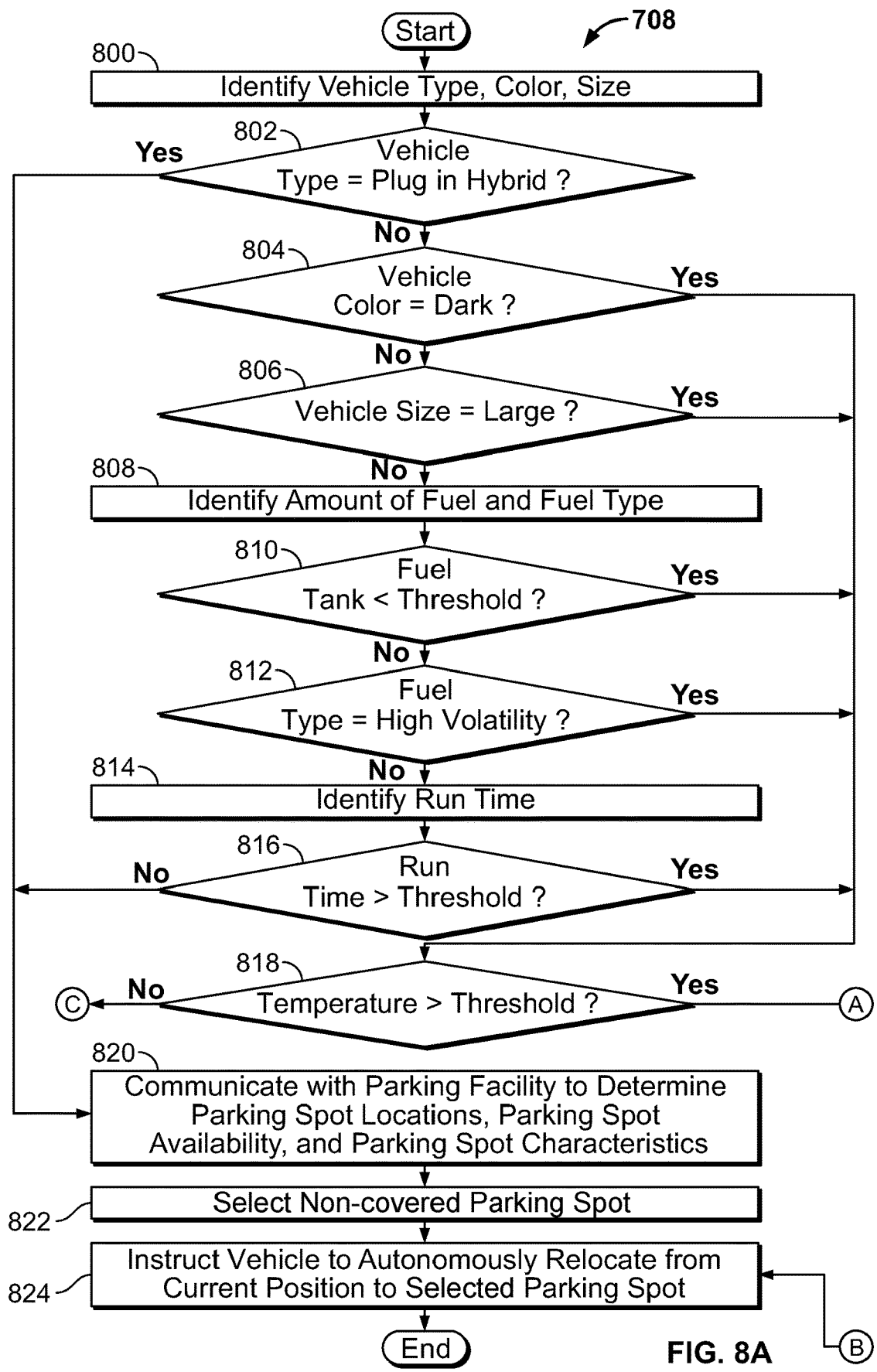
FIGS. 8A-8C are example flowcharts representative of example methods that may be performed to implement the parking spot selector of FIG. 5.
Figure 8B:
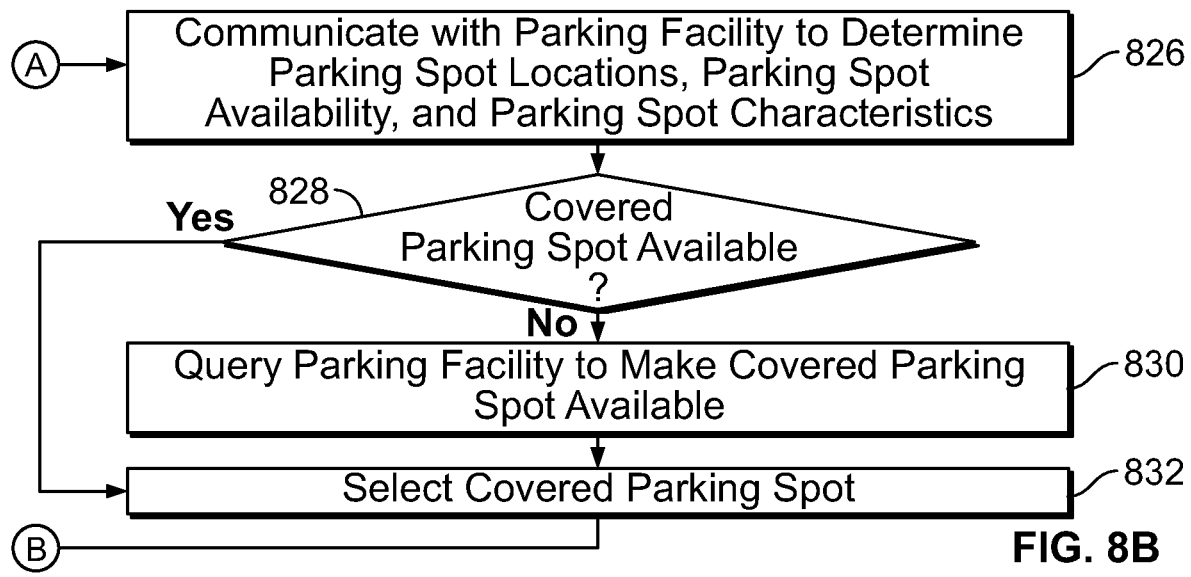
Figure 8C:
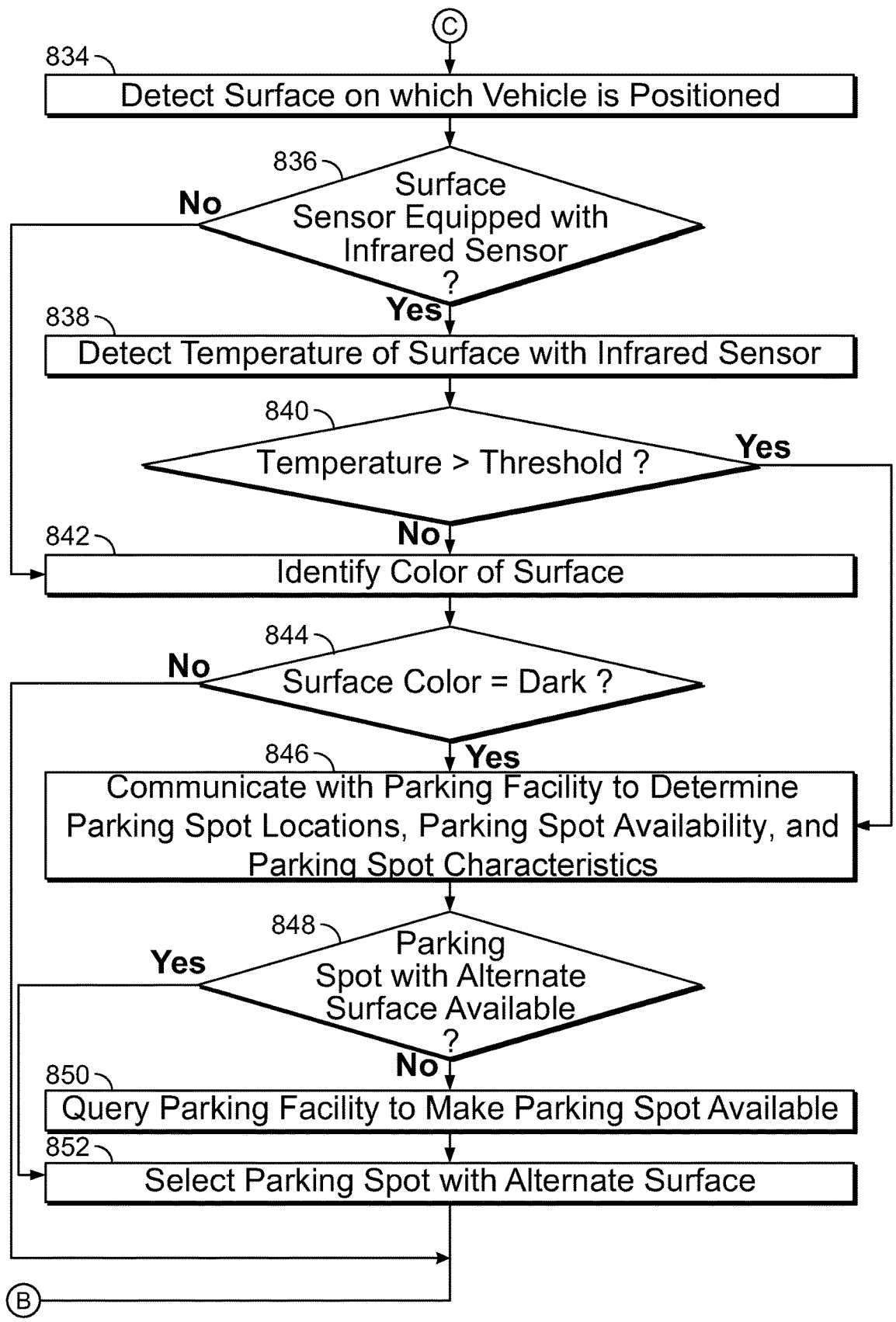
Figure 9:
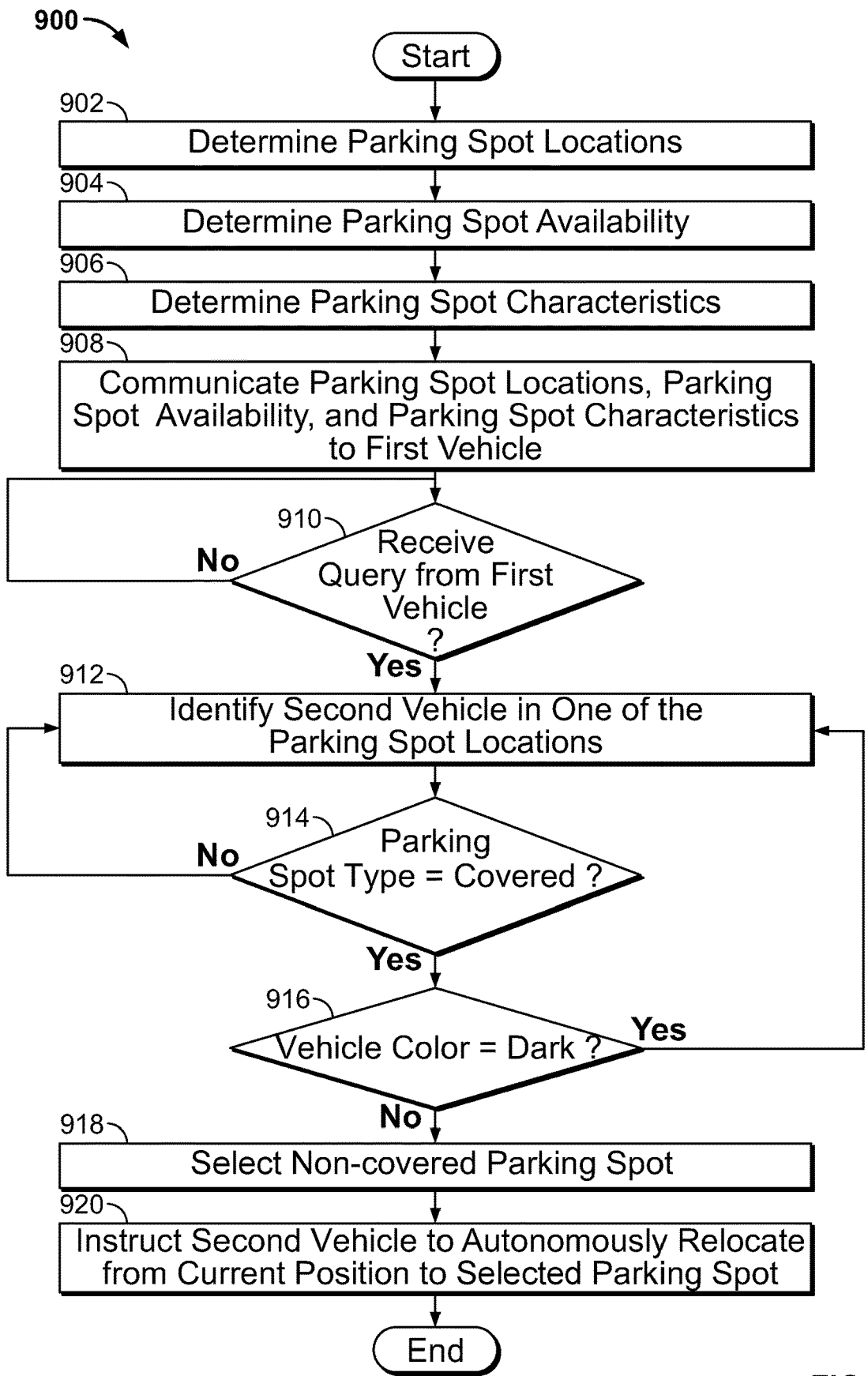
FIG. 9 is a flowchart representative of an example method that may be performed to implement the parking facility manager of FIG. 6.

A flowchart representative of an example method for implementing the vehicle control system 300 of FIG. 4 is shown in FIG. 7. Flowcharts representative of example methods for implementing the parking spot selector 404 of FIG. 5 are shown in FIGS. 8A-8C. A flowchart representative of an example method for implementing the parking facility manager 306 of FIG. 6 is shown in FIG. 9. In some examples, the methods may be implemented using machine-readable instructions that comprise programs for execution by a processor such as the processor 1012 shown in the processor platform 1000 discussed below in connection with FIG. 10. The programs may be embodied in software stored on a tangible computer readable storage medium such as a CD-ROM, a floppy disk, a hard drive, a digital versatile disk (DVD), a Blu-ray disk, or a memory associated with the processor 1012, but the entire programs and/or parts thereof could alternatively be executed by a device other than the processor 1012 and/or embodied in firmware or dedicated hardware. Further, although the programs are described with reference to the flowcharts illustrated in FIGS. 7-9, many other methods of implementing the parking spot selector 404 and the parking facility manager 306 may alternatively be used. For example, the order of execution of the blocks may be changed, and/or some of the blocks described may be changed, eliminated, or combined.

As mentioned above, the methods of FIGS. 7-9 may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine-readable storage medium" are used interchangeably. Additionally or alternatively, the methods of FIGS. 7-10 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 7 is a flowchart representative of an example method 700 that may be performed to implement the vehicle control system 300 of FIG. 4. The method 700 begins with the environment sensor 400 determining a temperature of the environment surrounding the vehicle (e.g., 80 degree Fahrenheit) (block 702). The vehicle identifier 402 determines a characteristic of the vehicle (e.g., dark color) (block 704). The surface sensor 406 determines a characteristic of the surface on which the vehicle is located (block 706). At block 708, the parking spot selector 404 selects a parking spot based on the temperature, the vehicle characteristics, and/or the characteristic of the surface on which the vehicle is located. After block 08, the method 700 ceases operation. The method 700 may repeat, loop, or otherwise be subsequently executed.

FIGS. 8A-8C are example flowcharts representative of example methods that may be performed to implement the parking spot selector 404 of FIG. 5. FIGS. 8A-8C illustrate an example implementation of block 708 (FIG. 7) to select a parking spot based on temperature, vehicle characteristics, and/or surface characteristics. The example implementation of block 708 begins at block 800. At block 800, the vehicle characterizer 500 identifies the vehicle type, color, and/or size from the vehicle identifier 402 (FIG. 4). The vehicle characterizer 500 then determines whether the vehicle type is a plug-in hybrid (block 802). In some examples, plug-in hybrid vehicles have fully-sealed metal fuel tanks that limit evaporative emissions in many environmental conditions. However, most vehicles do not have such fuel tanks. Therefore, if the vehicle characterizer 500 determines that the vehicle type is not a plug-in hybrid (block 802: NO), the vehicle characterizer 500 determines whether the vehicle color is dark (block 804).

If the vehicle characterizer 500 determines that the vehicle color is not dark (block 804: NO), the vehicle characterizer 500 determines whether the vehicle size is large (block 806). In some examples, larger vehicles have large surface areas that absorb more radiation from sunlight than smaller vehicles, independent of color. For example, a large, light-colored vehicle (e.g., yellow) may absorb comparable and/or more radiation from sunlight than a small, dark-colored vehicle (e.g., navy blue). If the vehicle characterizer 500 determines that the vehicle size is not large (block 806: NO), control proceed to block 808. At block 808, the fuel indicator 504 identifies the amount of fuel and/or the fuel type in the fuel tank 106 (FIG. 1). In some examples, the fuel indicator 504 identifies the amount of fuel in the fuel tank and/or the fuel type based on information received from the vehicle identifier 402.

The fuel indicator 504 determines whether the fuel tank 106 has less than a threshold amount of fuel (e.g., half a tank) (block 810). If the fuel indicator 504 determines that the fuel tank 106 does not have less than the threshold amount of fuel (block 810: NO), then the fuel indicator 504 determines whether the fuel type is high volatility (e.g., winter fuel) (block 812). If the fuel indicator 504 determines that the fuel type is not high volatility (e.g., low volatility summer fuel, diesel, biofuel, fuel cell, etc.) (block 812: NO), control proceeds to block 814. At block 814, the run time indicator 512 determines the amount of time the vehicle 202 was/has been running (e.g., run time). The run time indicator 512 determines whether the vehicle 202 was/has been running for more than a threshold amount of time (e.g., an hour) (block 816). In some examples, the run time indicator 512 estimates a run time based on miles driven since last engine ignition and/or average speed of the vehicle. In such examples, the run time indicator 512 obtains information regarding miles driven since last engine ignition and/or average speed of the vehicle from the vehicle identifier 402.

If the vehicle characterizer 500 determines that the vehicle color is dark (block 804: YES), the vehicle characterizer 500 determines that the vehicle size is large (block 806: YES), the fuel indicator 504 determines that the fuel tank is less than a threshold (e.g., half a tank) (block 810: YES), the fuel indicator 504 determines that the fuel type is high volatility (e.g., winter fuel) (block 812: YES), or the run time indicator 512 determines that the vehicle run time is greater than a threshold (e.g., one hour) (block 816: YES) (e.g., any one of blocks 804, 806, 810, 812, 816: YES), then control proceeds to block 818.

If the vehicle characterizer 500 determines that the vehicle type is a plug-in hybrid (block 802: YES) or the run time indicator 512 determines that the vehicle run time is not greater than a threshold (e.g., one hour) (block 816: NO), then control proceeds to block 820. At block 820, the parking facility communicator 506 communicates with at least one of the first visual display 220 of the first parking facility 204 or the second visual display 222 of the second parking facility 210 to determine parking spot locations, parking spot availability, and parking spot characteristics. In some examples, the parking facility database 510 stores and/or updates previously communicated parking spot locations, parking spot availability, and parking spot characteristics from the at least one of the first visual display 220 of the first parking facility 204 or the second visual display 222 of the second parking facility 210.

Based on the environmental characteristics, the vehicle characteristics, the parking spot locations, the parking spot availability, and/or the parking spot characteristics, the vehicle relocator 514 selects an available non-covered parking spot (block 822). In some examples, a non-covered parking spot is located when the vehicle 202 is a plug-in hybrid or none of blocks 804, 806, 810, 812, 816, or 818 results in a "YES." While blocks 804, 806, 810, 812, and 816 are illustrated in a serial configuration, one or more of the blocks 804, 806, 810, 812, and 816 may be executed in parallel. In examples where the blocks 804, 806, 810, 812, and 816 are performed in parallel, control proceeds to block 818 when any of the blocks 804, 806, 810, 812, and 816 results in "YES" and control proceeds to block 820 when any of the blocks 804, 806, 810, 812, and 816 results in "NO."

The vehicle relocator 514 instructs the vehicle 202 to relocate from its current position to the selected parking spot (block 824). In some examples, the vehicle relocator 514 instructs the vehicle 202 to relocate autonomously. In some examples, the vehicle relocator 514 instructs the vehicle 202 to present navigation directions to a driver so that the driver may relocate the vehicle 202 to the selected parking spot. In the illustrated example of FIG. 8A, a light-colored small vehicle with more than a threshold amount of low volatility fuel that was running for less than a threshold amount of time is instructed to relocate to a non-covered parking spot. However, any vehicle that is light-colored, has more than a threshold amount of fuel, has a low volatility fuel type, or was running for less than a threshold amount of time may be instructed to relocate to a non-covered parking spot. Thereafter, the implementation of block 708 ceases operation. The implementation of block 708 may repeat, loop, or otherwise be subsequently executed.

At block 818, the temperature detector 508 determines whether the temperature is greater than a threshold (e.g., 75 degrees Fahrenheit). The temperature detector 508 obtains information regarding the temperature surrounding the vehicle 202 from the environment sensor 400 (FIG. 4). If the temperature detector 508 determines at block 818 that the temperature surrounding the vehicle 202 is greater than a threshold (e.g., 75 degrees Fahrenheit) (block 818: YES), control proceeds to block 826 (FIG. 8B). At block 826 the parking facility communicator 506 communicates with at least one of the first visual display 220 of the first parking facility 204, the second visual display 222 of the second parking facility 210, and/or the parking facility manager 306 to determine parking spot locations, parking spot availability, and parking spot characteristics.

Based on the environmental characteristics, the vehicle characteristics, the parking spot locations, the parking spot availability, and/or the parking spot characteristics, the vehicle relocator 514 determines whether a covered parking spot is available (block 828). If the vehicle relocator 514 determines that a covered parking spot is not available (block 828: NO), control proceeds to block 830. At block 830, the parking facility communicator 506 queries the at least one of the first visual display 220 of the first parking facility 204 (FIG. 2), the second visual display 222 of the second parking facility 210 (FIG. 2), or the parking facility manager 306 (FIG. 3) to make available a covered parking spot. In response to the query, the parking facility manager 306 makes available a covered parking spot in at least one of the first parking facility 204 or the second parking facility 210, as further described in connection with FIG. 10. In some examples, the parking facility communicator 506 queries the at least one of the first visual display 220 of the first parking facility 204 (FIG. 2), the second visual display 222 of the second parking facility 210 (FIG. 2), or the parking facility manager 306 (FIG. 3) to make available a non-covered parking spot.

If the vehicle relocator 514 determines that a covered parking spot is available (block 828: YES), or a covered parking spot becomes available in at least one of the first parking facility 204 or the second parking facility 210 in response to the query by the parking facility communicator 506, the vehicle relocator 514 selects an available covered parking spot (block 832). In some examples, a covered parking spot is located when the temperature surrounding the vehicle 202 is greater than a threshold (e.g., 75 degrees Fahrenheit) and any of blocks 804, 806, 810, 812, or 816 results in a "YES." Control returns to block 824.

However, if the temperature detector 508 determines that the temperature is not greater than a threshold (e.g., 75 degrees Fahrenheit) (block 818: NO), control proceeds to block 834. At block 834, the surface sensor 406 (FIG. 4) detects the surface on which the vehicle 202 (FIG. 2) is positioned. The surface characterizer 502 (FIG. 5) determines whether the surface sensor 406 is equipped with an infrared sensor (e.g., a camera with infrared for night vision/mode) (block 836). If the surface sensor is equipped with an infrared sensor (block 836: YES), then the surface characterizer 502 determines the temperature of the surface based on readings detected by the infrared sensor of the surface sensor 406 (block 838). The temperature detector 508 determines whether the temperature from block 838 is greater than a threshold (e.g., 85 degrees Fahrenheit) (block 840).

If the temperature detector 508 determines that the temperature from block 838 is not greater than the threshold (block 840: NO) or if the surface sensor is not equipped with an infrared sensor (block 836: NO), then the surface sensor 406 identifies the color of the surface (block 842). The surface characterizer 502 determines whether the surface color identified in block 842 is dark (block 844). As disclosed herein, dark surfaces (e.g., asphalt) absorb more radiation from sunlight than light surfaces (e.g., concrete) and have higher temperatures. Therefore, if the temperature detector 508 determines that the temperature from block 838 is greater than the threshold (block 840: YES) or if the surface color identified in block 842 is dark (block 844: YES), control proceeds to block 846. However, if the surface color identified in block 842 is not dark (block 844: NO), control returns to block 824.

At block 846 the parking facility communicator 506 communicates with the parking facility manager 306 (e.g., directly or through at least one of the first visual display 220 of the first parking facility 204 or the second visual display 222 of the second parking facility 210) to determine parking spot locations, parking spot availability, and parking spot characteristics. Example parking spot characteristics include covered/non-covered, asphalt/concrete surface, high/low ambient temperature, high/low surface temperature, etc.

Based on the communicated parking spot locations, parking spot availability, and parking spot characteristics, the vehicle relocator 514 determines whether a parking spot with an alternate surface is available (block 848). In some examples, the alternate surface is a surface of a different color than the surface on which the vehicle 202 is currently located. For example, the vehicle relocator 514 searches for a parking spot with a concrete surface (e.g., a light-colored surface) when the vehicle 202 is currently located on an asphalt surface (e.g., a dark-colored surface). In some examples, the optimized surface is any surface cooler than the surface on which the vehicle 202 is currently located. For example, the vehicle relocator 514 searches for an asphalt surface in a shaded location (e.g., where sun exposure is obstructed or semi-obstructed by an awning, a building, trees, etc.) when the vehicle 202 is located on an asphalt surface in direct sunlight.

If the vehicle relocator 514 determines that a parking spot with an alternate surface is not available (block 848: NO), control proceeds to block 850. At block 850, the parking facility communicator 506 queries the parking facility manager 306 (FIG. 3) (e.g., directly or indirectly through at least one of the first visual display 220 of the first parking facility 204 or the second visual display 222 of the second parking facility 210 (FIG. 2)) to make available a parking spot with an alternate surface. In some examples, the parking facility manager 306 makes available a parking spot with an alternate surface in at least one of the first parking facility 204 or the second parking facility 210 in response to the query. For example, the parking facility manager 306 may relocate vehicles without an EVAP canister and/or vehicles with fully-sealed metal fuel tanks (e.g., plug-in hybrid vehicles) because such vehicles are less susceptible to environmental conditions than other vehicles.

If the vehicle relocator 514 determines that a parking spot with an alternate surface is available (block 848: YES), or a parking spot with an alternate surface becomes available in at least one of the first parking facility 204 or the second parking facility 210 in response to the query by the parking facility communicator 506, the vehicle relocator 514 selects an available parking spot with an alternate surface (block 852). In some examples, a parking spot with an alternate surface is located when the temperature of the surface on which the vehicle 202 is currently located is greater than a threshold (e.g., 85 degrees Fahrenheit) or the surface on which the vehicle 202 is currently located has a dark color. Thereafter, control returns to block 824.

FIG. 9 is a flowchart representative of an example method 900 that may be performed to implement the parking facility manager 306 of FIG. 6. The method 900 begins at block 902. At block 902, the parking spot locator 600 determines parking spot locations within at least one of the first parking facility 204 or the second parking facility 210. The parking spot availability indicator 604 determines parking spot availability of the determined parking spot locations within at least one of the first parking facility 204 or the second parking facility 210 (block 904).

At least one of the surface characterizer 602, the temperature detector 608, or the parking spot type identifier 610 determine parking spot characteristics of the determined parking spot locations within at least one of the first parking facility 204 or the second parking facility 210 (block 906). For example, the surface characterizer 602 determines characteristics of the surfaces (e.g., dark/asphalt, light/concrete, etc.) of the parking spots locations within at least one of the first parking facility 204 or the second parking facility 210. In some examples, the temperature detector 608 determines the ambient temperature and/or the surface temperature of the parking spots locations within at least one of the first parking facility 204 or the second parking facility 210. In some examples, the parking spot type identifier 610 determines a type (e.g., covered, non-covered, non-covered shaded, etc.) the parking spots locations within at least one of the first parking facility 204 or the second parking facility 210.

The communicator 606 communicates the determined parking spot locations, parking spot availability, and parking spot characteristics to a first vehicle (e.g., the vehicle 202) (block 908). In some examples, the communicator 606 communicates the determined parking spot locations, parking spot availability, and parking spot characteristics directly to the first vehicle (e.g., wirelessly over a network). In some examples, the communicator 606 communicates the determined parking spot locations, parking spot availability, and parking spot characteristics to at least one of the first visual display 220 of the first parking facility 204 or the second visual display 222 of the second parking facility 210. In such examples, the at least one of the first visual display 220 of the first parking facility 204 or the second visual display 222 of the second parking facility 210 relay (e.g., visually and/or wirelessly) the communicated determined parking spot locations, parking spot availability, and parking spot characteristics to the first vehicle.

At block 910, the communicator 606 waits for a query from the first vehicle. If the communicator 606 receives a query from the first vehicle to relocate a second vehicle currently parked in at least one of the first parking facility 204 or the second parking facility 210 (block 910: YES), control proceeds to block 912. Otherwise (block 910: NO), control loops back to block 910. In some examples, the communicator 606 continuously waits for queries from the first vehicle. In some examples, the communicator 606 waits for a query for a threshold amount of time before the method 900 cease operation (e.g., a timeout). The method 900 may repeat, loop, or otherwise be subsequently executed.

At block 912, the vehicle relocator 612 identifies a second vehicle in one of the parking spot locations. The vehicle relocator 612 determines whether the one of the parking spot locations where the second vehicle is located is a covered parking spot based on the parking spot type determined by the parking spot type identifier 610 in block 906 (block 914). If the vehicle relocator 612 determines that the one of the parking spot locations where the second vehicle is located is a covered parking spot (block 914: YES), control proceeds to block 916. Otherwise (block 914: NO), control returns to block 912. In some examples, the query from the first vehicle to relocate a second vehicle currently parked in at least one of the first parking facility 204 or the second parking facility 210 corresponds to a dark-colored vehicle attempting to relocate to a covered parking spot. In such examples, the vehicle relocator 612 ignores non-covered parking spot locations. Additionally or alternatively, in examples where the query from the first vehicle to relocate a second vehicle currently parked in at least one of the first parking facility 204 or the second parking facility 210 corresponds to a light-colored vehicle attempting to relocate to a non-covered parking spot, the vehicle relocator 612 ignores covered parking spot locations.

The vehicle relocator 612 determines whether the color of the second vehicle is a dark color (block 916). In some examples, the communicator 606 sends a query to the second vehicle to determine the color of the second vehicle. In such examples, the vehicle identifier 402 of the second vehicle communicates to the vehicle relocator 612 of the parking facility manager 306 the color of the second vehicle. In some examples, the parking spot availability indicator 604 determines a color of the second vehicle using a sensor, such as, for example, a camera. If the vehicle relocator 612 determines that the color of the second vehicle is a dark color (block 916: YES), control returns to block 912. Otherwise (block 916: NO), control proceeds to block 918. In some examples, the query from the first vehicle to relocate a second vehicle currently parked in at least one of the first parking facility 204 or the second parking facility 210 corresponds to a dark-colored vehicle attempting to relocate to a covered parking spot. In such examples, the vehicle relocator 612 ignores dark-colored vehicles in covered parking spots. Additionally or alternatively, in examples where the query from the first vehicle to relocate a second vehicle currently parked in at least one of the first parking facility 204 or the second parking facility 210 corresponds to a light-colored vehicle attempting to relocate to a non-covered parking spot, the vehicle relocator 612 ignores light-colored vehicles in non-covered parking spots.

At block 918, the vehicle relocator 612 selects an available non-covered parking spot. In some examples, the vehicle relocator 612 sends instructions to the second vehicle through the communicator 606. The vehicle relocator 612 instructs the second vehicle to relocate from its current position to the selected parking spot (block 920). In some examples, the vehicle relocator 612 instructs the second vehicle to relocate autonomously to the selected parking spot. In some examples, the vehicle relocator 612 instructs the second vehicle to present navigation directions to a driver so that the driver may relocate the second vehicle to the selected parking spot. Thereafter, the method 900 ceases operation. The method 900 may repeat, loop, or otherwise be subsequently executed.

Additionally or alternatively, in examples where the query from the first vehicle to relocate a second vehicle currently parked in at least one of the first parking facility 204 or the second parking facility 210 corresponds to a light-colored vehicle attempting to relocate to a non-covered parking spot containing a dark-colored second vehicle, the vehicle relocator 612 selects an available covered parking spot. In such examples, the vehicle relocator 612 instructs the dark-colored second vehicle to relocate from its current position to the selected parking spot. In some examples, the vehicle relocator 612 instructs the second vehicle to relocate autonomously to the selected parking spot. In some examples, the vehicle relocator 612 instructs the second vehicle to present navigation directions to a driver so that the driver may relocate the second vehicle to the selected parking spot.

Figure 10:
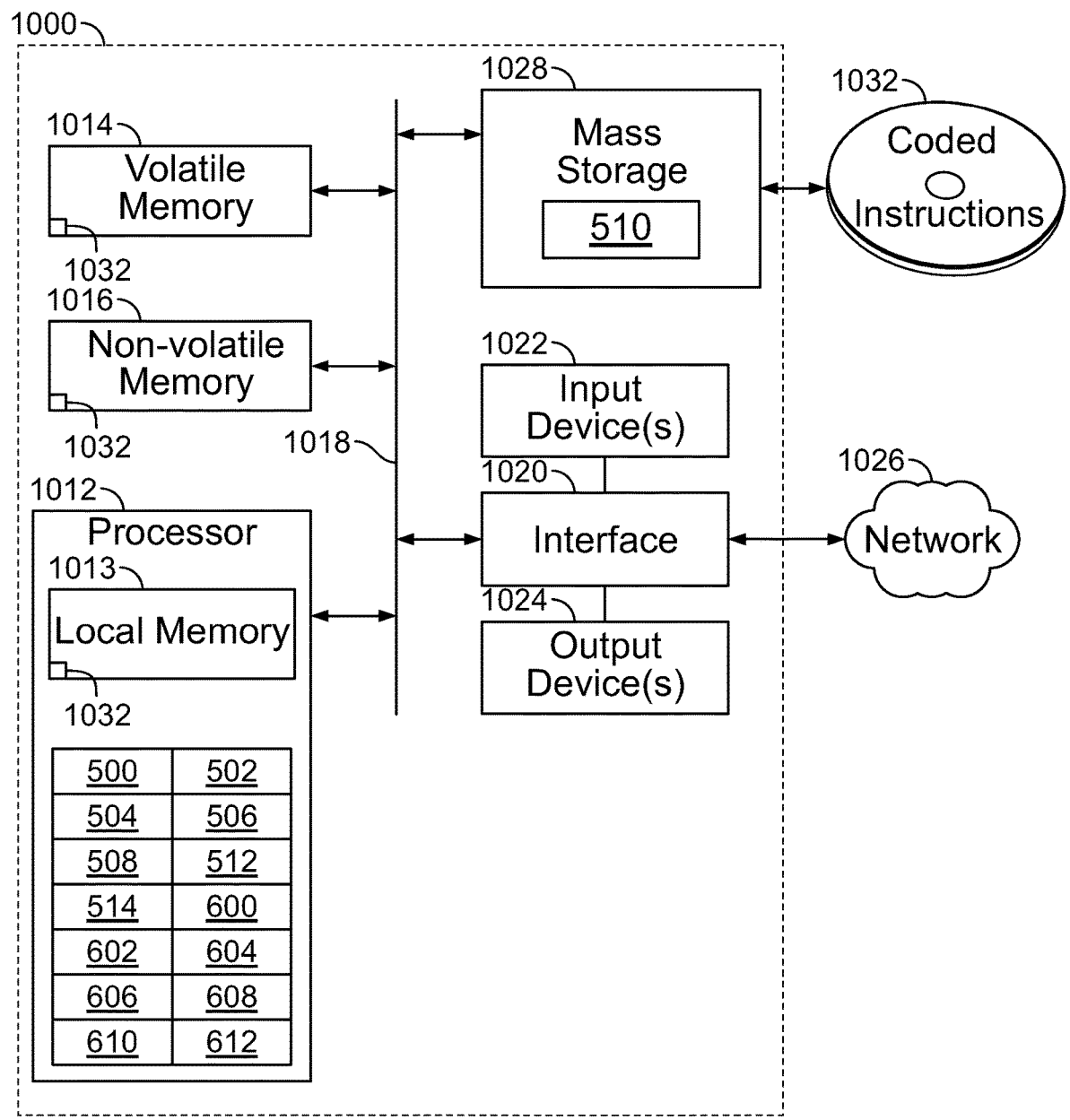
FIG. 10 is a block diagram of a processor platform capable of executing machine-readable instructions to implement the methods of FIGS. 7-9, and the vehicle control system of FIG. 4, the parking spot selector of FIG. 5, and the parking facility manager of FIG. 6.

FIG. 10 is a block diagram of a processor platform 1000 capable of executing machine-readable instructions to implement the method of FIG. 7, the vehicle control system 300 of FIG. 4, the methods of FIGS. 8A-8C, the parking spot selector 404 of FIG. 5, the method of FIG. 9, and the parking facility manager 306 of FIG. 6. The processor platform 1000 can be, for example, a vehicle control system, an on-board computing device, a navigation system, a mobile device (e.g., a cell phone, a smart phone, a tablet such as an iPad™), a personal digital assistant (PDA), an Internet appliance, a DVD player, a CD player, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. In the illustrated example of FIG. 10, the processor 1012 is programmed to implement the vehicle characterizer 500, the surface characterizer 502, the fuel indicator 504, the parking facility communicator 506, the temperature detector 508, the run time indicator 512, the vehicle relocator 514, the parking spot locator 600, the surface characterizer 602, the parking spot availability indicator 604, the communicator 606, the temperature detector 608, the parking spot type identifier 610, and/or the vehicle relocator 612.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, and/or a light emitting diode (LED)) and/or speakers. The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. In the illustrated example of FIG. 10, the one or more mass storage devices 1028 include the parking facility database 510. Examples of such mass storage devices 1028 include floppy disk drives, hard drive disks, compact disk drives, Blu-ray disk drives, RAID systems, and digital versatile disk (DVD) drives.

Coded instructions 1032 to implement the methods of FIGS. 7-9 may be stored in the mass storage device 1028, in the volatile memory 1014, in the non-volatile memory 1016, and/or on a removable tangible computer readable storage medium such as a CD or DVD.

From the foregoing, it will be appreciated that the above disclosed methods, apparatus and articles of manufacture locate parking spots for vehicles based on vehicle and environmental characteristics to decrease fuel vaporization and to avoid saturating the EVAP canister of the vehicle. Decreasing fuel vaporization and avoiding saturation of the EVAP canister reduces the amount of evaporative emissions introduced into the environment and allows a vehicle to reclaim more fuel vapor for combustion, thereby making the vehicle more fuel efficient.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A vehicle, comprising:
   a sensor to determine a temperature of an environment surrounding the vehicle;
   a vehicle identifier to determine a characteristic of the vehicle; and
   a parking spot selector to select a parking spot based on the temperature and the characteristic of the vehicle, wherein the parking spot is configured to:
     select a covered parking spot when the temperature is above a threshold and the characteristic of the vehicle indicates that the vehicle is a first color; and
     select a non-covered parking spot when the temperature is above the threshold and the characteristic of the vehicle indicates that the vehicle is a second color different from the first color.

2. The vehicle as defined in claim 1, wherein the parking spot selector comprises a parking facility communicator to communicate with a parking facility to determine at least one of parking spot locations, parking spot availability, or parking spot characteristics.

3. The vehicle as defined in claim 1, wherein the parking spot selector comprises a fuel indicator to determine a volatility of a fuel in the vehicle, and wherein the parking spot selector is configured to select the parking spot based on the volatility of the fuel.

4. The vehicle as defined in claim 1, wherein the parking spot selector comprises a run time indicator to determine a length of time the vehicle has been running prior to selecting the parking spot, and wherein the parking spot selector is configured to select the parking spot based on the length of time the vehicle has been running.

5. The vehicle as defined in claim 1, wherein the sensor is a first sensor, further comprising a second sensor to detect a surface on which the vehicle is positioned, wherein the parking spot selector comprises a surface characterizer to determine a characteristic of the surface, and wherein the parking spot selector is configured to select the parking spot based on the characteristic of the surface.

6. The vehicle as defined in claim 1, wherein the parking spot selector comprises a vehicle relocator to instruct the vehicle to relocate autonomously from a current position to the parking spot.

7. A method comprising:
   determining, by a processor, a temperature of an environment surrounding a vehicle;
   determining, by the processor, a characteristic of the vehicle;
   selecting, by the processor, a parking spot based on the temperature and the characteristic of the vehicle, wherein selecting the parking spot comprises:
     selecting a covered parking spot when the temperature is above a threshold and the characteristic of the vehicle indicates that the vehicle is a first color; and
     selecting a non-covered parking spot when the temperature is above the threshold and the characteristic of the vehicle indicates that the vehicle is a second color different from the first color.

8. The method as defined in claim 7, further comprising communicating with a parking facility to determine at least one of parking spot locations, parking spot availability, or parking spot characteristics.

9. The method as defined in claim 7, further comprising:
   determining a volatility of a fuel in the vehicle; and
   selecting the parking spot based on the volatility of the fuel.

10. The method as defined in claim 7, further comprising:
    determining a length of time the vehicle has been running prior to locating the parking spot; and
    selecting the parking spot based on the length of time the vehicle has been running.

11. The method as defined in claim 7, further comprising:
    determining a characteristic of a surface on which the vehicle is positioned; and
    selecting the parking spot based on the characteristic of the surface.

12. The method as defined in claim 7, further comprising instructing the vehicle to relocate autonomously from a current position to the parking spot.

13. A tangible computer readable storage medium comprising instructions that, when executed, cause a machine to at least:
    determine a temperature on an environment surrounding to a vehicle;
    determine a characteristic of the vehicle;
    select a parking spot based on the temperature and the characteristic of the vehicle, wherein selecting the parking spot comprises:
      select a covered parking spot when the temperature is above a threshold and the characteristic of the vehicle indicates that the vehicle is a first color; and
      select a non-covered parking spot when the temperature is above the threshold and the characteristic of the vehicle indicates that the vehicle is a second color different from the first color; and
    instruct the vehicle to relocate autonomously from a current position to the parking spot.

14. The tangible computer readable storage medium as defined in claim 13, wherein the instructions, when executed, further cause the machine to communicate with a parking facility to determine at least one of parking spot locations, parking spot availability, or parking spot characteristics.

15. The tangible computer readable storage medium as defined in claim 13, wherein the instructions, when executed, further cause the machine to:
   determine a volatility of a fuel in the vehicle; and
   select the parking spot based on the volatility of the fuel.

16. The tangible computer readable storage medium as defined in claim 13, wherein the instructions, when executed, further cause the machine to:
   determine a characteristic of a surface on which the vehicle is positioned; and
   select the parking spot based on the characteristic of the surface.

17. The tangible computer readable storage medium as defined in claim 13, wherein the instructions, when executed, further cause the machine to:
   determine a length of time that the vehicle has been running prior to selecting the parking spot; and
   select the parking spot based on the length of time that the vehicle has been running.

* * * * *